United States Patent
Shen et al.

(10) Patent No.: US 9,661,827 B1
(45) Date of Patent: May 30, 2017

(54) SYSTEMS AND METHODS FOR WALKING PETS

(71) Applicant: SZ DJI TECHNOLOGY CO., LTD., Shenzhen (CN)

(72) Inventors: Yu Shen, Shenzhen (CN); Ang Liu, Shenzhen (CN); Guyue Zhou, Shenzhen (CN)

(73) Assignee: SZ DJI TECHNOLOGY CO., LTD., Shenzen (CN)

( * ) Notice: Subject to any disclaimer, the term of this patent is extended or adjusted under 35 U.S.C. 154(b) by 0 days.

(21) Appl. No.: 15/214,076

(22) Filed: Jul. 19, 2016

Related U.S. Application Data

(63) Continuation of application No. PCT/CN2014/090082, filed on Oct. 31, 2014.

(51) Int. Cl.
| | |
|---|---|
| *G01S 13/91* | (2006.01) |
| *G01S 13/93* | (2006.01) |
| *A01K 15/02* | (2006.01) |
| *A01K 15/04* | (2006.01) |
| *A01K 27/00* | (2006.01) |

(52) U.S. Cl.
CPC .......... *A01K 15/021* (2013.01); *A01K 15/04* (2013.01); *A01K 27/00* (2013.01); *G01S 13/91* (2013.01); *G01S 13/93* (2013.01)

(58) Field of Classification Search
CPC ......... G01S 13/91; G01S 13/93; A01K 15/00; A01K 15/02; A01K 15/021; A01K 15/04; A01K 27/00–27/009
USPC ................... 342/175; 119/702–849
See application file for complete search history.

(56) References Cited

U.S. PATENT DOCUMENTS

| | | | | |
|---|---|---|---|---|
| 3,716,029 | A * | 2/1973 | Pillsbury, Jr. | A01K 15/027 119/701 |
| 6,072,173 | A * | 6/2000 | Soshi | B60K 31/0008 250/221 |
| 6,213,056 | B1 * | 4/2001 | Bergmann | A01K 15/027 119/701 |

(Continued)

FOREIGN PATENT DOCUMENTS

| | | |
|---|---|---|
| CN | 102809969 A | 12/2012 |
| CN | 103941750 A | 7/2014 |

(Continued)

OTHER PUBLICATIONS

"Waking Dogs With Drones", Jeff Myers, https://vimeo.com/95078536, May 13, 2014, retrieved Sep. 26, 2016.*

(Continued)

*Primary Examiner* — Peter Bythrow
(74) *Attorney, Agent, or Firm* — Wilson Sonsini Goodrich & Rosati

(57) ABSTRACT

Systems and methods are provided for guiding a target object with an unmanned aerial vehicle (UAV) in an environment. The UAV may be able to recognize and locate the target object. The UAV can be configured to communicate the actions and behavior of the target object to a user through a user device in communication with the UAV. The UAV can provide positive and negative stimuli to the target object to encourage an action or behavior. The UAV can be configured to recognize and manage waste generated by the target object.

30 Claims, 14 Drawing Sheets

(56) References Cited

U.S. PATENT DOCUMENTS

| | | | | |
|---|---|---|---|---|
| 6,782,847 B1* | 8/2004 | Shemesh | A01K 15/02 | 119/718 |
| 7,156,054 B1* | 1/2007 | York | A01K 15/027 | 119/701 |
| 7,479,884 B1* | 1/2009 | Fullerton | G01S 13/003 | 340/572.1 |
| 7,937,042 B2* | 5/2011 | Light | A01K 15/021 | 119/719 |
| 8,028,662 B2* | 10/2011 | Raymond | A01K 15/02 | 119/711 |
| 8,253,572 B2* | 8/2012 | Lytle, Jr. | A01K 27/004 | 119/771 |
| 8,392,065 B2 | 3/2013 | Tolstedt et al. | | |
| 8,707,900 B1* | 4/2014 | Womble | A01K 5/0114 | 119/51.11 |
| 8,744,666 B2* | 6/2014 | Switkes | G08G 1/166 | 280/292 |
| 8,805,008 B1* | 8/2014 | Gillis | G06K 9/6218 | 382/103 |
| 8,890,871 B2* | 11/2014 | Alasaarela | A01K 15/021 | 345/440 |
| 8,908,573 B1* | 12/2014 | Wang | H04L 5/26 | 370/280 |
| 8,922,363 B2* | 12/2014 | So | A01K 27/009 | 119/719 |
| 9,031,714 B1* | 5/2015 | Everett | F41H 11/16 | 701/2 |
| 9,131,664 B2* | 9/2015 | Tanigawa | A01K 29/005 | |
| 2002/0046713 A1* | 4/2002 | Otto | A01K 15/021 | 119/720 |
| 2005/0005876 A1* | 1/2005 | Calvi | A01K 27/003 | 119/771 |
| 2008/0262669 A1* | 10/2008 | Smid | G05D 1/0212 | 701/23 |
| 2009/0146793 A1* | 6/2009 | Fullerton | G06K 19/0723 | 340/10.4 |
| 2010/0042269 A1* | 2/2010 | Kokkeby | G01S 3/7864 | 701/3 |
| 2012/0210853 A1* | 8/2012 | Abershitz | B64F 1/04 | 89/1.11 |
| 2012/0312250 A1 | 12/2012 | Jesurum | | |
| 2014/0018979 A1* | 1/2014 | Goossen | G08G 5/0034 | 701/3 |
| 2014/0020635 A1 | 1/2014 | Sayers et al. | | |
| 2014/0037278 A1* | 2/2014 | Wang | F16M 11/10 | 396/55 |
| 2014/0062754 A1* | 3/2014 | Mohamadi | F41H 11/136 | 342/22 |
| 2014/0222246 A1* | 8/2014 | Mohamadi | G01S 13/913 | 701/2 |
| 2015/0175276 A1* | 6/2015 | Koster | B64F 1/32 | 244/114 R |
| 2015/0350614 A1* | 12/2015 | Meier | H04N 7/188 | 348/144 |
| 2016/0070265 A1* | 3/2016 | Liu | B64C 39/024 | 701/3 |
| 2016/0116915 A1* | 4/2016 | Pulleti | G01S 13/56 | 701/3 |

FOREIGN PATENT DOCUMENTS

| | | |
|---|---|---|
| JP | H0536383 A | 2/1993 |
| JP | 2000157089 A | 6/2000 |
| JP | 2008061640 A | 3/2008 |

OTHER PUBLICATIONS

"Luna Personal Robot Can Walk the Dog", Shane McGlaun, http://technabob.com/blog/2011/05/11/luna-dog-walking-robot/, May 11, 2011, retrieved Sep. 26, 2016.*

A UAV leads a pet dog in a park for a walk, and will be an antifact walking a dog. City Watch. May 29, 2014. 8 pages. (in Chinese with machine translation) http://www.chengshiw.com/mil/2014/369142.html.

Gonzalez. Drones could be the next dog walkers. May 21, 2014. 16 pages. http://www.psfk.com/2014/05/drone-dog-walker.html#!bpmfN1.

International search report and written opinion dated Jul. 28, 2015 for PCT/CN2014/090082.

Myers. Walking Dogs With Drones. Published May 13, 2014. 3 pages. https://vimeo.com/95078536.

Panetta. Would you use a drone to walk your dog? 2 pages. http://www.ecnmaag.com/printpdf/blogs/2014/05/would-you-use-drone-walk-your-dog. Jul. 28, 2014.

Saul, Isaac. "Here Is How To Walk A Dog With A Drone." The Huffington Post. TheHuffingtonPost.com, May 19, 2014. Web.

* cited by examiner

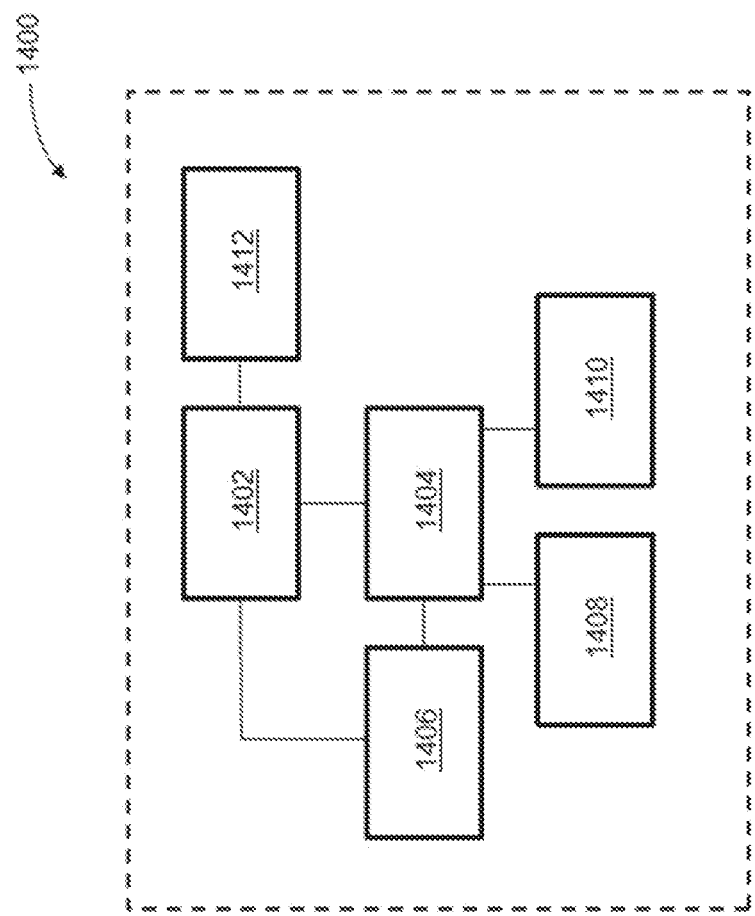

SYSTEMS AND METHODS FOR WALKING PETS

CROSS-REFERENCE

This application is a continuation application of International Application No. PCT/CN2014/090082, filed on Oct. 31, 2014, which is incorporated herein by reference in its entirety.

BACKGROUND OF THE INVENTION

Aerial vehicles such as unmanned aerial vehicles (UAVs) can travel along defined routes.

Individuals can have pets that require regular exercise and time outside of a home or building. Individuals may not have time or desire to take their pets outside. Oftentimes individuals may hire human pet walkers, which can be costly.

SUMMARY OF THE INVENTION

A need exists to provide a method of guiding a target object by a movable object, such as an unmanned aerial vehicle (UAV), along a predefined route, instantaneously defined route, or an undefined route within a designated area or region. A UAV can be configured to autonomously or semi-autonomously guide a pet or target object along a route in order to provide the target object with exercise or time outdoors. Provided herein are systems and methods of guiding a target object by a UAV. The systems and methods further provide the ability to provide a defined route or a defined region where a UAV can guide a target object. Communication can occur between a user and the UAV in response to the defined route and/or region. Further communication can occur related to actions or behaviors exhibited by the target object. The UAV can be configured to locate the target object and to recognize actions and behaviors exhibited by the target object. The target object may be an animal such as a pet owned by a user.

In an aspect the invention, a method of guiding a target object comprises, receiving a user input, through a user device, that defines a target area, the target area comprises (1) a permissible area for the target object to travel, or (2) an impermissible area where the target object is not permitted to travel; receiving, from a movable object that guides the target object, a signal indicative of a location of the movable object; and receiving an indicator of the movable object exiting the permissible area for the target object to travel or an indicator of the movable object entering the impermissible area where the target object is not permitted to travel, said indicator generated based on the location of the movable object and the target area; and generating a movable object operation, in response to the indicator.

In some cases the target object can be an animal. The moveable object can be an unmanned aerial vehicle (UAV). The movable object operation can include controlling flight of the UAV to control movement of the target object. The movable object operation can include alerting the user that the UAV is exiting the permissible area or entering the impermissible area. The user input can comprise global coordinates that can define the permissible area or the impermissible area.

The user input can comprise an image or outline on a map defining the boundaries of the permissible area or the impermissible area. In some instances the method can comprise guiding the target object using the UAV, wherein the UAV can be physically attached to the target object. The UAV can be attached to the target object by a leash that is attached to a collar of the target object.

In some cases, the UAV can be a rotorcraft comprising a plurality of rotors that can permit the UAV to take off and/or land vertically. The UAV can comprise a location device that transmits information about the UAV's location. The location device can be a GPS sensor. The indicator of exiting the permissible area can be received when the target object exits the permissible area. The indicator of exiting the permissible area can be received when the target object is within a predetermined threshold distance of a boundary of the permissible area and the target object is heading in the direction of the boundary. The target object can be heading in the direction of the boundary at a speed exceeding a threshold speed. The indicator of entering the impermissible area can be received when the target object enters the impermissible area. The indicator of entering the impermissible area can be received when the target object is within a predetermined threshold distance of a boundary of the impermissible area and the target object is heading in the direction of the boundary. The target object can be heading in the direction of the boundary at a speed exceeding a threshold speed. The movable object operation can include playing the user's voice to the target object when the indicator of exiting the permissible area or entering the impermissible area is received. The method can further comprise transmitting the user's voice from the user device to the UAV in real-time. The user's voice can be a pre-recording. The movable object operation can include delivering an electric shock to the target object if the target object does not respond to the user's voice within a predetermined period of time. The user interface can be a screen of the UAV and the alert can be provided visually. The user interface can be a speaker of the UAV and the alert can be provided audibly.

In another aspect of the invention, a system for guiding a target object can comprise: one or more processors, individually or collectively, configured to: (a) receive a signal indicative of a user input that defines a target area, said target area comprising (1) a permissible area for the target object to travel, or (2) an impermissible area where the target object is not permitted to travel; (b) receive a signal indicative of a location of a movable object that guides the target object; and (c) determine, based on the target area and the signal indicative of the location of the movable object, when the movable object is exiting the permissible area for the target object to travel or when the movable object is entering the impermissible area where the target object is not permitted to travel; and (d) determine a movable object operation, in response to the determination of whether the movable object is exiting the permissible area for the target object to travel or entering the impermissible area where the target object is not permitted to travel.

In some cases, the target object can be an animal. The movable object can be an unmanned aerial vehicle (UAV). The moveable object operation can include controlling flight of the UAV to control movement of the target object. The movable object operation can include alerting the user that the UAV is exiting the permissible area or entering the impermissible area. The UAV can be physically attached to the target object while the UAV is guiding the target object. The UAV can be attached to the target object by a leash that is attached to a collar of the target object.

The UAV can be a rotorcraft comprising a plurality of rotors that permit the UAV to take off and/or land vertically.

The UAV can comprise a location device that transmits information of the UAV's location. The location device can be a GPS sensor.

In some cases, the indicator of exiting the permissible area can be provided when the target object exits the permissible area. The indicator of exiting the permissible area can be provided when the target object is within a predetermined threshold distance of a boundary of the permissible area and the target object is heading in the direction of the boundary. The target object can be heading in the direction of the boundary at a speed exceeding a threshold speed. The one or more processors can be configured to determine the UAV is entering the impermissible area when the target object enters the impermissible area. The one or more processors can be configured to determine that the UAV is entering the impermissible area when the target object is within a predetermined threshold distance of a boundary of the impermissible area and the target object is heading in the direction of the boundary. The one or more processors can be configured to determine that the target object is heading in the direction of the boundary at a speed exceeding a threshold speed.

The movable object operation can include playing the user's voice to the target object when the indicator of exiting the permissible area or entering the impermissible area is received, and the one or more processors are configured to effect the movable object operation. The user's voice can be transmitted from the user device to the UAV in real-time. The user's voice can be a pre-recording. The movable object operation can include delivering an electric shock to the target object if the target object does not respond to the user's voice within a predetermined period of time. The user interface can be a screen of the UAV and the alert can be provided visually. The user interface can be a speaker of the UAV and the alert can be provided audibly.

In an aspect of the invention, a method of guiding a target object using a movable object can comprise: recognizing the target object wearing a collar, with aid of one or more vision sensors on board the UAV; automatically attaching, without human aid, the movable object to the collar of the target object using a leash when the target object is recognized; and flying the movable object while the target object is attached to the movable object via the leash.

The target object can be an animal. The movable object can be an unmanned aerial vehicle (UAV), and the UAV can be flying while the target object is in locomotion. The leash can be formed of a flexible or bendable material. The method can further comprise extending or retracting the leash while the UAV is in flight. The leash can attach to the collar of the target object using one or more magnetic connection. The leash can attach to the collar of the target object with aid a robotic arm. The robotic arm can comprise one or more extension that guides the leash to the collar.

The method can further comprising capturing, using the one or more vision sensors, at least one image of the target object wearing the collar. The method can further comprise recognizing, with aid of one or more processors, the target object from the image of the target object. The movable object can further comprise one or more processors configured to recognize the target object from the image of the collar.

The movable object can be a UAV, and the method can further comprise flying the UAV, subsequent to recognizing the target object, to a closer proximity of the target object in order to get into position to automatically attach the UAV to the collar of the target object. Flying the movable object can include guiding the target object by pulling on the leash. The method can further comprise comparing a calculation of the target object motion and the movable object motion to determine one or more parameter with which the movable object pulls on the leash.

The method can further comprise collecting, using the movable object, an image of the target object while the target object is in locomotion and is attached to the movable object via the leash. The method can further comprise displaying, on a map, the location of the movable object to the user. The method can further comprise playing the user's voice to the target object while the target object is in locomotion and is attached to the movable object via a leash. The user's voice can be transmitted from the user device to the movable object in real-time. The user's voice can be a pre-recording. The user's voice can be speaking a command to the target object.

In an aspect of the invention, a UAV can be configured to guide a target object, the UAV can comprise: one or more vision sensors configured to capture an image of the target object wearing a collar; one or more processors configured to, individually or collectively, recognize the target object from the image of the target object wearing the collar; a leash attachment mechanism configured to automatically attach, without human aid, a leash to the collar of the target object when the target object is recognized; and one or more propulsion units configured to permit flight of the UAV while the target object is attached to the UAV via the leash.

The target object can be an animal. The UAV can be flying while the target object is in locomotion. The leash can be formed of a flexible or bendable material. The leash can be extendible or retractable while the UAV is in flight. The leash can be configured to attach to the collar of the target object using one or more magnetic connection. The leash can be configured to attach to the collar of the target object with aid of a robotic arm. The robotic arm can comprise one or more extension that guide the leash to the collar. The one or more vision sensors can be configured to capture at least one image of the target object wearing the collar. The UAV can further comprise one or more processors configured to recognize the target object from the image of the target object. The UAV can further comprise one or more processors configured to recognize the target object from the image of the collar. The one or more processors can be configured to, subsequent to recognizing the target object, generate a signal to the one or more propulsion units to effect flight of the UAV to a closer proximity of the target object in order to get into position to automatically attach the UAV to the collar of the target object.

The UAV can be configured to guide the target object by pulling on the leash. The one or more processors can be configured to compare a calculation of the target object motion and the UAV motion to determine one or more parameter with which the UAV pulls on the leash. The one or more vision sensors can be configured to collect an image of the target object while the target object is in locomotion and is attached to the UAV via the leash. The one or more vision sensors can be configured to collect an image of the collar of the target object. The UAV can further comprise one or more speaker configured to play the user's voice to the target object while the target object is in locomotion and is attached to the UAV via the leash. The user's voice can be transmitted from the user device to the UAV in real-time. The user's voice can be a pre-recording. The user's voice can be speaking a command to the target object.

In another aspect of the invention, a method of guiding a target object using a UAV can comprise: recognizing the target object, with aid of one or more vision sensors on board the UAV; automatically displaying, without human aid or invention, an attractor to the target object when the target object is recognized; and flying the UAV while the target object is in locomotion and following the attractor.

The target object can be an animal. The attractor can be an edible treat. The method can further comprise emitting, using the attractor, a selected scent. The UAV can display the attractor by dangling the attractor at or near a head level of the target object. The attractor can comprise an image that is displayed on a screen carried by the UAV. The image can be a static image. The image can be an image of an owner of the target object. The image can be a video. The image can be a video of the owner of the target object.

The method can further comprise determining, using the one or more vision sensors, a location of the target object relative to the UAV and adjusting or maintaining the speed of the UAV flight to remain within a proximity of the target object that is sufficiently close for the target object to perceive the attractor. The method can further comprise determining, using the one or more vision sensors, a trajectory of the locomotion of the target object relative to the UAV and adjusting or maintaining the direction of the UAV flight remain within a proximity of the target object that is sufficiently close for the target object to perceive the attractor. The method can further comprise capturing at least one image of the target object using the one or more vision sensors.

The UAV can further comprise one or more processors configured to recognize the target object from the image of the target object. The target object can be wearing a collar. The UAV can further comprise one or more processors configured to recognize the target object form the image of the collar.

The method can further comprise playing the user's voice to the target object while the target object is in locomotion and is attached to the UAV via the leash. The user's voice can be transmitted from the user device to the UAV in real-time. The user's voice can be a pre-recording. The user's voice can be saying a command to the target object.

In another aspect of the invention, a UAV configured to guide a target object can comprise: one or more vision sensors configured to capture an image of the target object wearing a collar; one or more processors configured to, individually or collectively, recognize the target object from the image of the target object; an attractor display mechanism configured to display, without human aid or intervention, an attractor to the target object when the target object is recognized; and one or more propulsion units configured to permit flight of the UAV while the attractor is displayed to the target object.

The target object can be an animal. The attractor can be an edible treat. The attractor can emit a selected scent. The UAV can display the attractor by dangling the attractor at or near a head level of the target object. The attractor can comprise an image that is displayed on a screen carried by the UAV. The image can be a static image. The image can be an image of an owner of the target object. The image can be a video. The image can be a video of the owner of the target object.

The UAV can be further configured to determine, using the one or more vision sensors, a location of the target object relative to the UAV and adjust or maintain the speed of the UAV flight to remain within a proximity of the target object that is sufficiently close for the target object to perceive the attractor. The UAV can be further configured determine, using the one or more vision sensors, a trajectory of the locomotion of the target object relative to the UAV and adjust or maintain the direction of the UAV flight remain within a proximity of the target object that is sufficiently close for the target object to perceive the attractor. The one or more vision sensors can capture at least one image of the target object. The UAV can further comprise one or more processors configured to recognize the target object from the image of the target object.

The target object can be wearing a collar. The UAV can further comprise a speaker configured to play the user's voice to the target object while the target object is in locomotion and is attached to the UAV via the leash. The user's voice can be transmitted from the user device to the UAV in real-time. The user's voice can be a pre-recording. The user's voice can be saying a command to the target object.

In another aspect of the invention, a method of guiding a target object may be provided. The method may comprise: providing a UAV that guides the target object, wherein a location of the UAV is known; recognizing the target object, with aid of one or more vision sensors on board the UAV; recognizing waste generated by the target object, with aid of the one or more vision sensors on board the UAV; and alerting the user that the waste has been generated by the target object.

The target object can be an animal. The animal can be a dog or a cat. The method can further comprise providing information to the user about a location where the waste was generated. The UAV can further comprise one or more processors configured to recognize the waste from the image of the waste. The user can be alerted through a user device. The user can be alerted through a user device comprising a display. The user device can be a smartphone, tablet, or a personal computer. The user device can display a map showing the location of where the waste was generated. The user device can display an image of the waste generated by the target object. The UAV can guide the target object by being physically attached to the target object. The UAV can be attached to the target object by a leash that is attached to the collar of the target object. The UAV can guide the target object by displaying an attractor to the target object. The attractor can be an edible treat. The user can be a target object waste removal professional. The UAV can comprise a location device that transmits information about the UAV's location. The location device can be a GPS sensor.

In another aspect of the invention, a UAV configured to guide a target object can comprise: one or more vision sensors configured to capture an image of the target object and waste generated by the target object; one or more processors configured to, individually or collectively, (1) recognize the target object from the image of the target object, and (2) recognize the waste generated by the target object from the image of the waste generated by the target object; a communication unit configured to send a signal to a user device that alerts the user that the waste has been generated by the target object; and one or more propulsion units configured to permit flight of the UAV while guiding the target object.

The target object can be an animal. The animal can be a dog or a cat. The UAV can be further configured to provide information to the user about a location where the waste was generated. The user device can comprise a display. The user device can be a smartphone, tablet, or personal computer. The user device can be configured to display a map showing the location of where the waste was generated. The user device can be configured to display an image of the waste generated by the target object.

The UAV can be configured to guide the target object by being physically attached to the target object. The UAV can be attached to the target object by a leash that is attached to the collar of the target object. The UAV can be configured to guide the target object by displaying an attractor to the target object. The attractor can be an edible treat. The user can be a target object waste removal professional.

The UAV can be a rotorcraft comprising a plurality of rotors that permit the UAV to take off and/or land vertically. The UAV can comprise a location device that transmits information about the UAV's location. The location device can be a GPS sensor.

In another aspect of the invention, a method of guiding a target object can comprise: providing a UAV that guides the target object, wherein a location of the UAV is known; recognizing the target object, with aid of one or more vision sensors on board the UAV; recognizing waste generated by the target object, with aid of the one or more vision sensors on board the UAV; and removing the waste in response to recognizing the waste, using the UAV.

The target object can be an animal. The animal can be a dog or a cat. The UAV can be further configured to provide information to the user about a location where the waste was generated. The user device can comprise a display. The user device can be a smartphone, tablet, or personal computer. The user device can be configured to display a map showing the location of where the waste was generated. The user device can be configured to display an image of the waste generated by the target object.

The UAV can be configured to guide the target object by being physically attached to the target object. The UAV can be attached to the target object by a leash that is attached to a collar of the target object. The UAV can be further configured to guide the target object by displaying an attractor to the target object. The attractor can be an edible treat. The user can be a target object waste removal professional.

The UAV can be a rotorcraft comprising a plurality of rotors that permit the UAV to take off and/or land vertically. The UAV can comprise a location device that transmits information about the UAV's location. The location device can be a GPS sensor.

The method can further comprise removing the waste with a mechanical arm.

In another aspect of the invention, a UAV can be configured to guide a target object, the UAV can comprise: one or more vision sensors configured to capture an image of the target object and waste generated by the target object; one or more processors configured to, individually or collectively, (1) recognize the target object from the image of the target object, and (2) recognize the waste generated by the target object from the image of the waste generated by the target object; one or more waste removal units, configured to remove the waste in response to the recognition of the waste; and one or more propulsion units configured to permit flight of the UAV while guiding the target object.

The target object can be an animal. The animal can be a dog or a cat. The UAV can be further configured to provide information to the user about a location where the waste was generated. The UAV can further comprise one or more processors configured to recognize the waste from the image of the waste. The UAV can guide the target object by being physically attached to the target object. The UAV can be attached to a leash that is attached to a collar of the target object. The UAV can guide the target object by displaying an attractor to the target object.

The attractor can be an edible treat. The UAV can be a rotorcraft comprising a plurality of rotors that permit the UAV to take off and/or land vertically. The UAV can comprise a location device that transmits information about the UAV's location. The location device can be a GPS sensor. The one or more waste removal units can include a mechanical arm that extends from the UAV to remove the waste.

In another aspect of the invention, a method of guiding a target object can comprise: receiving a user input, through a user device, a travel route for a UAV to guide the target object; guiding the target object using the UAV by flying the UAV along the travel route while the target object is in locomotion, wherein a location of the UAV is known; receiving, through the user device while the UAV is guiding the target object along the travel route, a change to the travel route to provide an updated travel route; and flying the UAV along the updated travel route.

The user input can comprise global coordinates that define the travel route. The user input can comprise global coordinates that define the updated travel route. The user input can comprise an image or line on a map defining the travel route. The user input can comprise an image or line on a map defining the updated travel route.

The UAV can guide the target object by being physically attached to the target object. The UAV can be attached to a leash that is attached to a collar of the target object. The target object can be an animal. The animal can be a dog or a cat. The UAV can be a rotorcraft comprising a plurality of rotors that permit the UAV to take off and/or land vertically. The UAV can comprise a location device that transmits information about the UAV's location. The location device can be a GPS sensor.

The method can further comprise capturing, with aid of one or more vision sensors on board the UAV, an image of the target object. The method can further comprise detecting, with aid of one or more processors, when the target object is deviating from the travel route or the updated travel route based on the image of the target object. The method can further comprise playing the user's voice to the target object when the target object is deviating from the travel route or the updated travel route. The user's voice can be transmitted from the user device to the UAV in real-time. The user's voice can be a pre-recording. The method can further comprise delivering an electric shock to the target object when the target object deviates from the travel route beyond a predetermined distance.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 shows an example of travel routes that the UAV can guide the target object on.

FIG. 14 is a schematic illustration by way of block diagram of a system for controlling a movable object, in accordance with an embodiment of the invention.

DETAILED DESCRIPTION OF THE INVENTION

Figure 1:
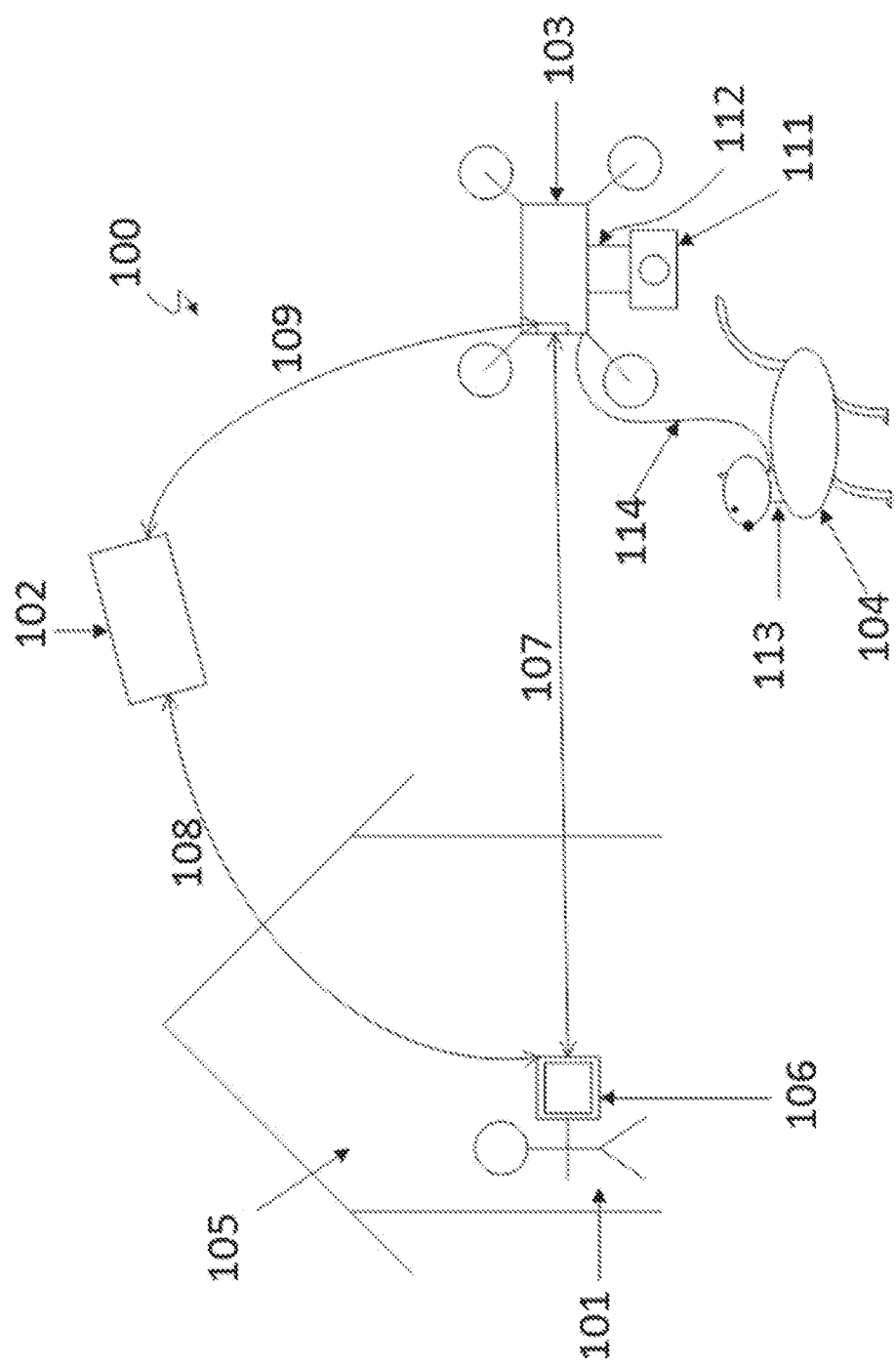
FIG. 1 shows an example of a system comprising a user, an unmanned aerial vehicle (UAV), and a target object where a UAV is configured to guide the target object while in communication with the user.

The systems, devices, and methods of the present invention provide mechanisms for guiding a target object by an unmanned aerial vehicle (UAV) along a predefined route, an instantaneously defined route, or an undefined route within a designated area or region. The systems, devices, and methods of the present invention further provide responses to recognized actions and/or behaviors of the target object. Description of the UAV may be applied to any other type of unmanned vehicle, or any other type of movable object.

A UAV can be provided to guide a target object. A user can provide instructions to the UAV to guide the target object through a device that is in communication with the UAV. The device may be directly in communication with the UAV or may communicate with the UAV over a network. The user can provide the instructions before the UAV guides the target object or while the UAV is guiding the target object in real time. In some cases the UAV can interface to broadcast a visual and/or audio stream or recording of the user to the target object.

The UAV can be configured to remain within a specified distance from the target object. In some cases, the target object can be attached to the UAV through a physical attachment mechanism (e.g. a leash). The UAV may exert force on the physical attachment mechanism to aid in guiding the target object. The UAV can comprise one or more vision sensors. The vision sensors can be in communication with a processor that is configured to recognize an image of the target object. The UAV can remain within a specified distance of the target object without being physically attached to the target object using the vision sensors and the one or more processors. In some cases, the UAV can provide an attractor to the target object when the target object refused to follow or remain with a specified distance from the UAV.

The UAV can be configured to lead or direct a target object or being. In some cases a target object can be one or more animals. A target object can be a pet. A pet can be, for example, a dog, cat, lizard, horse, rabbit, ferret, pig, or any rodent that may be kept as a pet by a user. The pet may be a mammal. In some cases, the pet may be a reptile. The pet may be a land bound pet that may traverse a surface. The pet may optionally be capable of being airborne (e.g. a bird). The UAV can lead a target object along a pre-defined path, along an undefined path in a pre-defined area, or anywhere in accordance with certain travel parameters (e.g., length of route, amount of time, remaining outside of impermissible areas).

The UAV can receive instructions regarding the pre-defined path or area from one or more processors. The processors can be on-board or off-board the UAV. For instance, the one or more processors may be on an external device such as a server, user device, or may be provided on a cloud computing infrastructure. The processors can additionally be in communication with at least one user through a communication interface. A user can provide parameters to define a path or geographic region for the UAV to direct a target object along or within respectively. A UAV can have a vision sensor. The vision sensor can be configured to recognize the target object. The UAV can continuously monitor the location of the target object. In some cases, the vision sensor can be configured to recognize an item attached to the target object, for example, a collar or harness. The UAV can be configured to maintain a fixed distance from the target object. In some cases the target object can be attached or tethered to the UAV, for example by a leash. Leash can be a flexible object that attaches on one end to the UAV and on the other end to the target object.

A processor can be in communication with one or more locating sensors on-board a UAV. A locating sensor can determine the position of a UAV in a relative or global coordinate system. A global coordinate system may be an absolute coordinate system. In an example a global coordinate system can define the location of the UAV using longitude and latitude. A relative coordinate system can determine the distance or location of a UAV from a reference point or landmark. A relative coordinate system can be derived from a measurement of movement of a UAV from a known starting point or movement of a UAV in a known area. A locating sensor configured to determine the absolute location of a UAV can be a GPS sensor. One or more locating sensors can be used to determine the relative location of a UAV. For example, relative angular velocity can be provided by a gyroscope; relative translational acceleration can be provided by an accelerometer; relative attitude information can be provided by a vision sensor; relative distance information can be provided by an ultrasonic sensor, lidar, or time-of-flight camera. The relative and or global location of the UAV can be communicated to the processor. The processor can inform a user through a user interface of the local or global position of the UAV. The global or local location of the UAV can correspond to the global or local location of the target object that may be in proximity of or tethered to the UAV.

The systems and methods herein may permit a UAV to aid in taking a target object out on a walk without requiring significant human intervention. For instance, a human may remain at home while the UAV guides the target object. The human may be able to monitor the situation in real-time and intervene if needed. The human may intervene remotely by communicating with the target object through the UAV, or may be informed of a location so the human can intervene in person if necessary.

FIG. 1 shows an example of a target object guidance system 100 including a user 101, one or more processors 102, and a UAV 103 guiding or leading a target object 104. The UAV 103 can guide the target object 104 along a pre-defined or an undefined path. The UAV 103 can guide the target object 104 for a specified duration of time. In some cases the target object can follow the UAV along a route. Alternatively the target object 104 can wander in a region while the UAV 103 follows the target object. In instances where the UAV 103 follows the target object 104 the UAV can prevent the target object from wandering into an impermissible regions or out of a permissible region. The UAV may or may not exert force on the target object while the target object is moving around.

The user 101 can be in a first location 105. A first location may be a house, yard, room, building, vehicle, or another space or area. A user 101 can communicate with one or more processors 102 through a user interface on an electronic device 106. In an example, a user interface can be on an electronic display such as a desktop computer, laptop computer, smart phone, smart watch, smart glasses, tablet, or another device configured to communicate with the one or more processors. The electronic device 106 may or may not be a mobile device. The electronic device may or may not be a remote terminal capable of manually controlling flight of the UAV. The electronic device can be in communication with the UAV directly through a wired or wireless connection 107. The electronic device can further be in communication with a processor 102, through a wired or wireless connection 108, the processor 102 can additionally be in communication with the UAV through a wired or wireless connection 109. Alternatively, the processor may be on-board the electronic device 106 and/or the UAV 103. For instance, the UAV can have one or more on-board processors. The one or more on-board processors can communicate with an external processor 102 and or an electronic device 106 with a user interface. The on-board processors may perform any functions of processors 102 described herein. Alternatively, a UAV can communicate directly with the electronic device to communicate with an intermediate device or processor.

The UAV can comprise a vision sensor 111. In an example a vision sensor 111 can be a camera. The vision sensor 111 can be enclosed in the body of the UAV or carried by the UAV as an external payload. In a case in which the vision sensor 111 is carried externally as a payload the UAV can orient the vision sensor below the body of the UAV. The vision sensor can be attached to the UAV by one or more attachments, such as a carrier 112. The carrier 112 can be configured such that the vision sensor can rotate and/or tilt independently of the UAV. The carrier may permit the vision sensor to translate and/or rotate in three-dimensions. For example, in Cartesian coordinates the carrier can permit translation and/or rotation of the vision sensor independently of the movement of the UAV about an x, y, or z axis. The vision sensor (e.g., camera) may be able to rotate about a pitch, roll, and/or yaw axis with respect to the UAV and/or a fixed reference frame. Similar rotation and translation can be achieved in any other three-dimensional coordinate system (e.g. spherical coordinates). In some cases the carrier may permit rotation and/or translation of the vision sensor about only one or about only two axes.

A target object 104 can optionally have a wearable identifier 113. For example, the target object may have a collar. The UAV vision sensor can detect a visual pattern on the wearable identifier in order to locate the target object. In some cases the target object 104 can be tethered to the UAV 103 by a physical connection 114. A physical connection 114 can be a flexible connector of a given length that is connected on one end to the target object 104 and on another end to the UAV 103. The physical connection may or may not expand or contract (thus being able to vary its length). The physical connection may have a limited maximum length (e.g., less than or equal to about 20 m, 15 m, 10 m, 7 m, 5 m, 4 m, 3 m, 2 m, or 1 m).

A user 101 can define a route or region in which the UAV 103 can guide or lead the target object 104. A user can define the route or region through a user interface on an electronic device 106 or any other device that may or may not be in communication with the UAV. A user can generate a defined area in which the user would like the target object to be led by the UAV 103. In some cases, a user 101 can define a specified route along which the user 101 would like the UAV 103 to guide the target object 104. In other cases the user 101 can instruct the UAV 103 to guide the target object 104 within a geographic area. In some instances, the user may define or choose a defined area where the UAV is not to guide that target object. When guiding the target object in a defined geographic area, the UAV 103 can be provided with an additional instruction from the user 101 to further constrain an act of guiding the target object 104 in the geographic area. In an example, the additional instruction can be a duration of total time, end time, total cumulative distance, pace, or performance of an event or task by the target object 104. A duration of total time may include the total amount of time to guide the target object (e.g., length of walk, such as a 30 minute walk). As the target object's pace may vary, the route or action of the UAV guiding the target object may be altered to comply with the duration of total time. In another example, the end time may be preset (e.g., finish guiding the target object and return home by 2:00 pm). Similarly, as the target object's pace may vary, the route or action of the UAV guiding the target object may be altered to comply with the end time (e.g., if the target object is moving slowly, a shortcut may be taken to get the target object home on time). A total cumulative distance may enable a user to define the distance to be traveled by the target object (e.g., a user may specify a 1 mile walk). The user may optionally set a pace for the guidance (e.g., have the target object move at a rate of at least 4 miles/hours). A user may set an event or task to be completed by the target object and monitored by the UAV (e.g., walk uphill, walk downhill, sprints, fetch an object, etc.). In some instances, the additional instructions may include impermissible areas to keep the target object away from.

The UAV 103 can have one or more sensors. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors.

The UAV can have sensors on-board the UAV that collect information directly from an environment without contacting an additional component off-board the UAV for additional information or processing. For example, a sensor that collects data directly in an environment can be a vision or audio sensor. Alternatively, the UAV can have sensors that are on-board the UAV but contact one or more components off-board the UAV to collect data about an environment. For example, a sensor that contacts a component off-board the UAV to collect data about an environment may be a GPS sensor or another sensor that relies on connection to a another device, such as a satellite, tower, router, server, or other external device.

Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Sensors may be used for surveillance of an environment or a subject of interest. Sensors may be used to recognize a target object, such as an animal. The target object may be distinguished from other objects in the environment. Sensors may be used to recognize an object worn or carried by the target object. The worn or carried object may be distinguished from other objects in the environment.

Any description herein of a UAV may apply to any type of movable object. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output may be provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV may be of small dimensions. The UAV may be capable of being lifted and/or carried by a human. The UAV may be capable of being carried by a human in one hand.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

Figure 2:
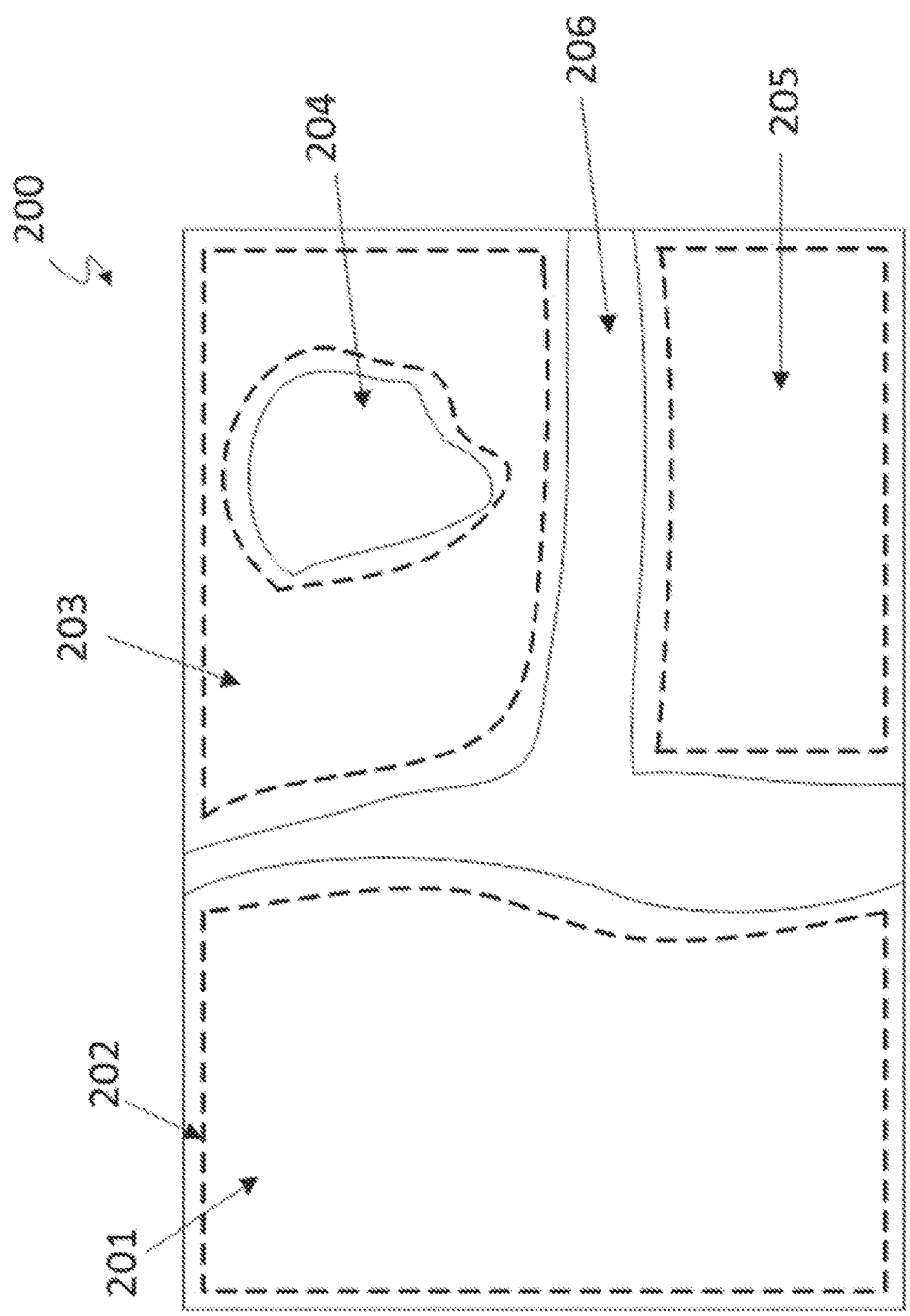
FIG. 2 shows a map that can be used to designate areas that a permissible for travel of the target object or impermissible for travel of the target object.

A user can define an area in which the UAV guides the target object. The user can define the area using a user interface that is in communication with a processor on-board or off-board the UAV. The one or more processors can be in communication with one or more memory storage units. The memory storage unit can store past user defined areas or routes. The memory storage device units can store geographic data, such as maps and may optionally be updated. A user can define a unique area or route each time the UAV guides the target object or the user can choose from one or more stored routes or areas. Examples of possible areas 200 in which the UAV can guide the target object are shown in FIG. 2. An area can be defined as a region in which the target object is permitted to travel, a boundary past which a target object is not permitted to travel, and/or a region in which the target object is not permitted to travel. In FIG. 2 region 201 can be an area in which a target object is permitted to travel. Region 201 can be enclosed by boundaries 202 past which the target object is not permitted to travel. In some cases, a region can enclose sub regions in which the target object is not permitted. Region 203 is an enclosed region in which the target object is permitted. Region 203 encloses region 204 in which the target object is not permitted to travel. In some cases, a region can be defined as the region enclosed by regions where the target object is not permitted. In this case a user can define a plurality of regions in which a target object is not permitted such that the pluralities of non-permitted regions enclose a region that is allowed. For example, region 205 can be a region in which a target object is permitted. Region 205 can be surrounded by region 206 in which the target object is not permitted. In one example, a UAV may be permitted to guide a pet within a park, such that the pet is permitted to remain within a lawn 203, while not being permitted to be guided on a road 206 or in a lake 204.

A region can be defined by a geographic radius. For example, a geographic radius can be a radial region centered at an initial location of a target object. In another example a geographic radius can be defined as a radial region centered at a location of a user. In some cases a geographic radius can be a radial region with a center point defined by a user. A user can define a geographic region using global coordinates. In some cases a geographic region can be defined as a region within user defined boundaries, the boundaries can be defined using global coordinates. A user-defined geofence may be provided which may function as a boundary of a permissible or region or an impermissible region for the target object to be. Any regular or irregular shape may be provided as a boundary. A geographic region can be bound by user defined obstacles. For example a user can instruct a UAV to guide a target object in a region without crossing a physical boundary or feature. A physical boundary or feature can be a fence, road, ditch, water way, or ground surface transition (e.g. grass to dirt or grass to pavement). The UAV can be configured to detect a physical boundary or feature or the UAV can know the location of the physical boundary or feature apriori.

Figure 3:
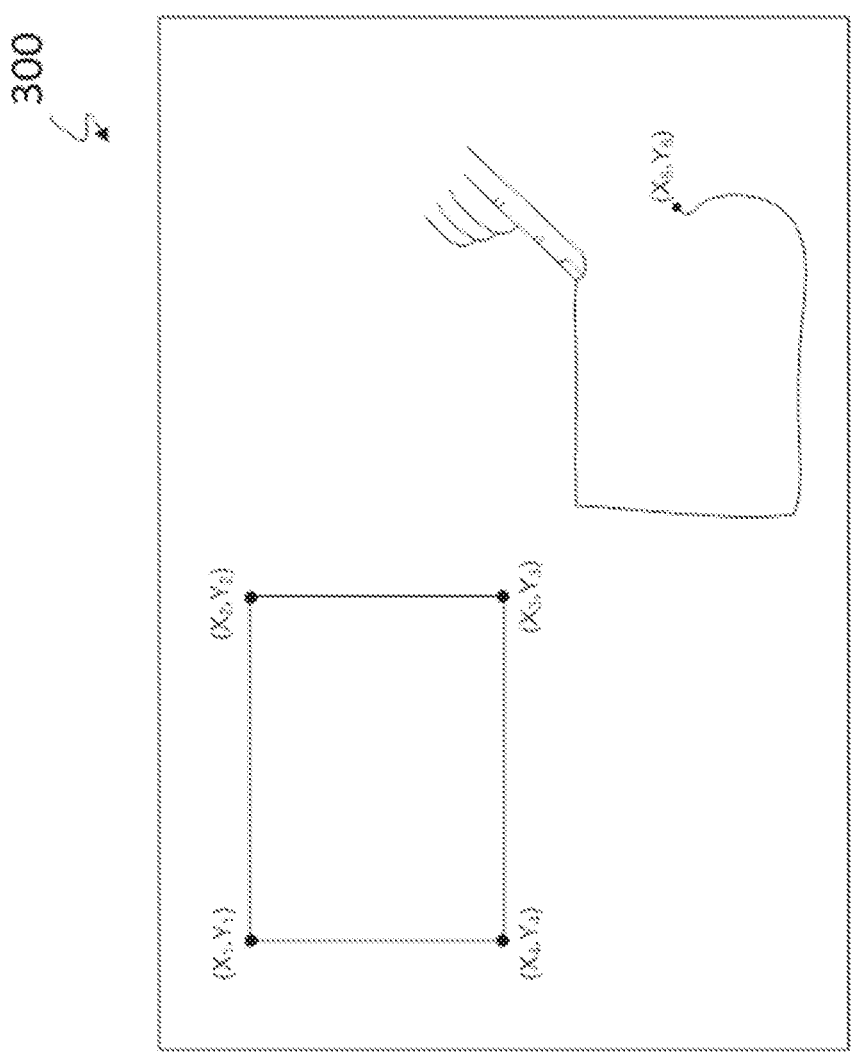
FIG. 3 shows an example of how a user can define a permissible or impermissible area for a target object to travel on a user interface.

In some cases a user can provide a visual map to define permissible and impermissible regions for the target object to travel. A visual map can be generated in a user interface on an electronic device. The user interface can provide a map of a chosen or local space in which a target object can be led by the UAV. A user can mark areas that are permissible or impermissible for the UAV and the target object to travel on the map provided by the user interface. In some cases, a user can mark areas on the map using a touch screen provided on the user interface. A user's finger or a pointer (e.g., mouse pointer, trackball pointer, etc.) may be used to trace the outline of boundaries. The user can draw circles on the user interface to define an area. Alternatively, the user can click on or touch points to define the coordinates of a region. In the example shown in FIG. 3 a user can provide an input to the user interface 300 to define a permissible or impermissible region for the UAV and the target object to travel. The input provided by the user can be communicated to the user interface by any method that is acceptable to the electronic device comprising the user interface, for example a user may communicate with the user interface on the electronic device through a tactile or audio command. In an example a user can speak the name or coordinates of a permissible or impermissible area, for example the user can give the command "Dog Park permissible" or "lake impermissible" to designate the dog park as permissible and the lake as impermissible travel regions for the UAV and the target object. In another example a user can draw or trace a region on a map that is permissible or impermissible for the UAV and the target object to travel. A user can draw or trace the region with their finger or a stylus. For example a user can define a set of coordinates $(X_1,Y_1)$, $(X_2,Y_2)$, $(X_3,Y_3)$, $(X_4,Y_4)$. Line segments can be formed to connect the set of coordinates and to enclose a geographic region. A user can define the enclosed geographic region as permissible or impermissible for travel of the target object. Alternatively, a user can define a first coordinate $(X_5,Y_5)$ and trace a closed region that includes the first coordinate, $(X_5,Y_5)$. The user can define this closed region as permissible or impermissible for travel of the target object.

One or more processors can monitor the location of the UAV while it is guiding a target object by receiving a location signal from one or more location signals on-board the UAV. The one or more processors can receive a user input signal that defines permissible areas for the target object to travel and/or impermissible areas for the target object to travel. The one or more processors can compare a locating signal from a UAV guiding a target object to the user input signal that defines permissible areas for the target object to travel and/or impermissible areas for the target object to travel to determine if the UAV has guided the target object outside of the permissible area or into an impermissible area. For example, a locating signal (e.g. GPS) from a UAV can be compared to a map of permissible and impermissible regions as defined by a user. When the UAV guiding the target object leaves the permissible areas for the target object to travel and/or enters the impermissible areas for the target object to travel the processor can initiate a response. The location of the target object can be approximated as the location of the UAV. The approximation that the location of the target object and the location of the UAV can be appropriate in cases when the UAV is very close to the target object, for example, when the target object is attached to the UAV by a relatively short leash. In some cases the location of the target object can be determined from a combination of the location of the UAV as determined by one or more location sensors and the location of the target object as determined from one or more vision sensors. For example, a location of a UAV can be known from a GPS sensor and the location of the target object relative to the UAV can be determined from one or more vision sensors configured to recognize the target object. One or more processors can determine the location of the target object relative to the UAV to determine the absolute location of the target object. In another embodiment the location of the target object can be known from a locating sensor on the target object, for example, a GPS sensor in a collar worn by the target object. A locating sensor on the target object can communicate with a processor on or off-board the UAV.

A response can be informing a user that the target object has deviated from the permissible area or entered the impermissible area. A user can be informed that the target object has deviated from the permissible area or entered the impermissible area through a user interface on an electronic device. The electronic device can alert a user with an audio signal, vibration signal, text message, phone call, video message, visual image message, electronic notification, and/ or email. In some cases a response can be a flight instruction to the UAV, the UAV can be instructed by the processor to re-enter the permissible area or exit the impermissible area. The processor can automatically provide a flight instruction to the UAV when the UAV has deviated from the permissible area or entered the impermissible area. Alternatively, the processor can provide a flight instruction to the UAV when the UAV has deviated from the permissible area or entered the impermissible area in response to a user input from an electronic device after the electronic device has alerted the user that the UAV has deviated from the permissible area or entered the impermissible area. The flight instruction can be for the UAV to return to the permissible area or exit the impermissible area. In some cases the flight instruction can be for the UAV to entice or direct the target object to control the movement of the target object such that the target object returns to the permissible area or exits the impermissible area. In an example, the user can provide a specific flight instruction to the UAV. The specific flight instruction can be for the UAV to fly a specific direction and a specified distance in that direction. The flight instruction can also include a specified distance that should be maintained between the UAV and the target object while the UAV is moving the specified distance in the specified direction. Alternatively, a user can initiate an automated or predetermined flight sequence to return the UAV and the target object to a permissible area.

The locating signal can indicate that the UAV has exited a permissible area for the target object to travel or that the UAV has entered an area that is impermissible for the target object to travel when the UAV crosses over a user defined boundary. In some cases, the locating signal can indicate that the UAV has exited a permissible area for the target object to travel or that the UAV has entered an area that is impermissible for the target object to travel when the UAV approaches and is within a predetermined threshold distance from a user defined boundary. The locating signal can indicate exiting a permissible area when a UAV is detected within a threshold distance from a user defined boundary regardless of the direction that the target object and the UAV are heading. In some cases, the locating signal can indicate exiting a permissible area when a UAV is detected within a threshold distance from a user defined boundary and the direction that the target object and the UAV is towards the boundary. The speed of the target object can be determined. The speed of the target object can be determined from a velocity sensor on-board the UAV. The speed of the target object can be estimated as the speed of the UAV as determined by the velocity sensor. In another embodiment the UAV can comprise a vision sensor to detect the location of the target object. The UAV can determine the speed of the target object from the measurements taken by the vision sensor using a processor on or off-board the UAV. In some cases the target object can wear a locating sensor, for example, a locating sensor imbedded in a collar worn by the target object. The locating sensor can be a GPS sensor. The locating sensor worn by the target object can be in communication with one or more processors on or off-board the UAV. The one or more processors can determine the speed of the target object from information transmitted by the locating sensor. The speed of the target object can be a factor in the indication that the UAV has exited a permissible area for the target object to travel or that the UAV has entered an area that is impermissible for the target object to travel when the UAV crosses over a user defined boundary. When the target object is detected heading in the direction of the boundary at a speed exceeding a threshold speed an indication that the UAV has exited a permissible area for the target object to travel or that the UAV has entered an area that is impermissible for the target object to travel when the UAV crosses over a user defined boundary can be provided.

Figure 4:
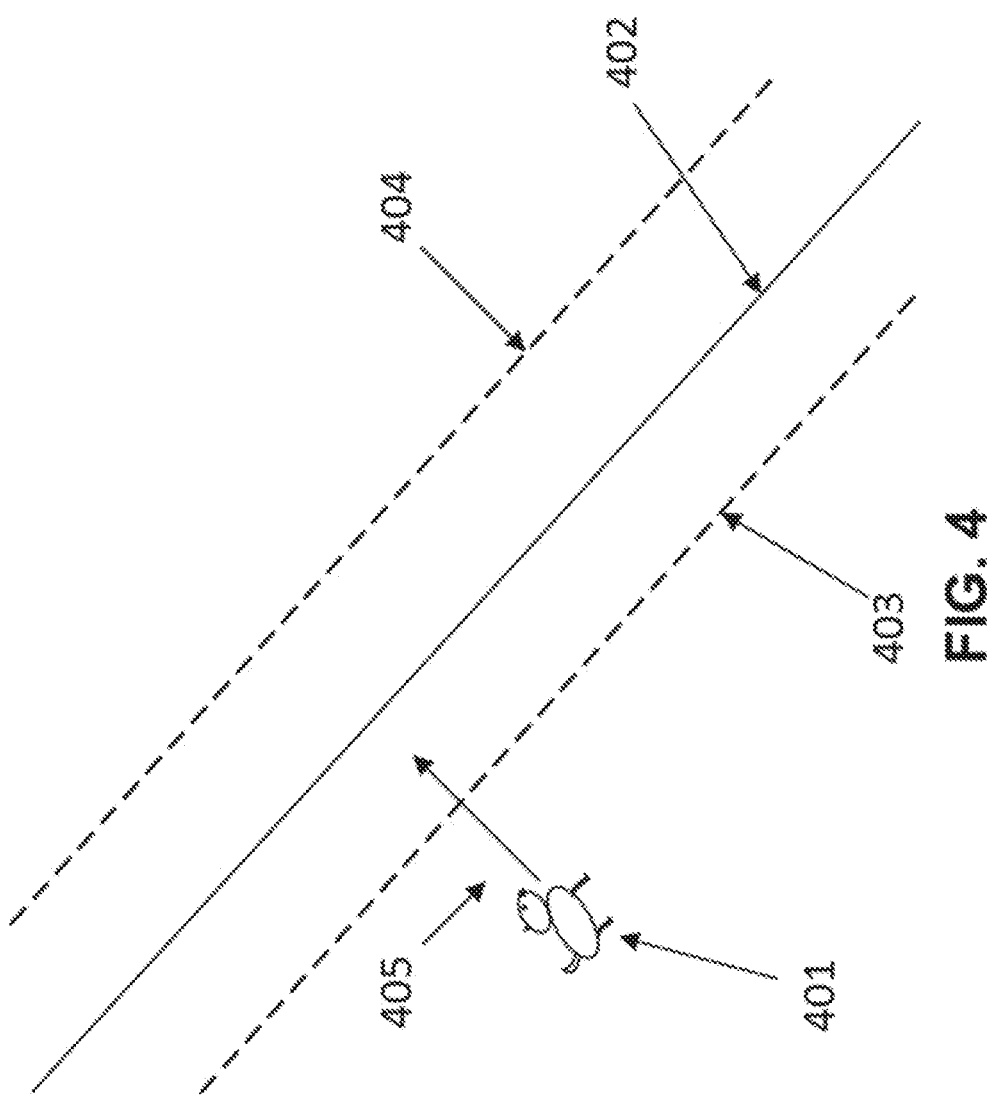
FIG. 4 shows a boundary and a threshold surrounding the boundary that can be approached and/or crossed by a target object.

FIG. 4 shows an example of a target object 401 within the proximity of a boundary 402. The boundary 402 can have either or both of a first threshold 403 and a second threshold 404. The first 403 and second 404 thresholds can outline either edge of the boundary 402. The distance between the boundary 402 and the first 403 and second 404 threshold can be defined by a user. In an example, the distance between the threshold and the boundary can be at least 1 inch (in), 6 in, 1 foot (ft), 2 ft, 3 ft, 4 ft, 5 ft, 6 ft, 7 ft, 8 ft, 9 ft, 10 ft, 11 ft, 12 ft, 13 ft, 14 ft, 15 ft, 16 ft, 17 ft, 18 ft, 19 ft, or 20 ft. In some cases, the distance between the boundary and a threshold can be greater than 20 ft. The distance between a boundary and threshold can fall between any of the listed values. The distance between the boundary 402 and the first 403 and second 404 threshold can be uniform or the distance can vary. The distance can vary along a boundary 402. The distance can vary such that the distance between a first threshold 403 and the boundary 402 is different from the distance between the boundary 402 and the second 404 threshold. In some cases a first boundary can have a first threshold distance and a second boundary can have a second threshold distance. For example, if a first boundary indicates that a target object cannot enter a dangerous area (e.g. street, parking lot, or a region containing other aggressive animals) a distance between the first boundary and the threshold can be relatively large. In another example, if a second boundary indicates that a target object cannot enter a comparatively less dangerous area (e.g. lake, neighbor's yard, or a dirt pile) a distance between the first boundary and the threshold can be relatively small. The direction that the target object is heading 405 can be a factor in determining if an indication that the target object has crossed a boundary 402 or a threshold 403, 404. For example, when a target object is heading in the direction of a boundary 402 or a threshold 403, 404 an indication that the target object is exiting a permissible area or entering an impermissible area can be provided.

A UAV can be physically connected or attached to the target object by a physical attachment mechanism. A physical attachment mechanism can be a leash, rope, or chain that tethers the target object to the UAV. The physical attachment mechanism can attach to a region on the body of the UAV on one end and the target object on the other end. The physical attachment mechanism can attach to a collar that is worn around a neck of the target object. Alternatively the physical attachment mechanism can attach to a harness that attaches to a body of the target object.

The UAV can provide a deterrent mechanism to the target object when the target object approaches a boundary or a threshold of a boundary such that the target object is exiting a permissible area or entering an impermissible area. The UAV may or may not be configured to provide sufficient force to pull a target object away from a boundary enclosing an impermissible area. In some cases the UAV may require a deterrent mechanism to prevent a target object from travelling into an impermissible area or out of a permissible area. The UAV can be configured only to provide one type of deterrent mechanism. Alternatively the UAV can be configured to provide a primary deterrent mechanism followed by at least one additional deterrent mechanism. The additional deterrent mechanism can be provided when the target object fails to obey the primary deterrent mechanism within a specified time interval after the primary deterrent mechanism is provided. In some cases, the additional deterrent mechanism can be harsher than the primary deterrent mechanism. The specified time interval between the primary and additional deterrent mechanism can be fixed or it can be dependent on the action of the target object. For example, if a target object is rapidly approaching a boundary of an impermissible region the specified time interval can be shorter than in cases where the target object is slowly approaching the boundary.

The deterrent mechanism can be the user's voice. The user's voice can be a recording played through a microphone on-board the UAV. The recording can be stored on a memory storage device on or off-board the UAV. In some cases a user can be alerted in real time though a user device that the target object is approaching a boundary or a threshold of a boundary such that the target object is exiting a permissible area or entering an impermissible area. The user's voice can be transmitted from the user device to the UAV in real time. The recording of the user's voice or the transmission of the user's voice in real time can be provided to the target object through a user interface on-board the UAV. The user interface on board the UAV can comprise a microphone to emit an audio alert to the target object. The audio alert can be a live stream or recording of a user's voice, an unpleasant sound, a high pitched ring, or any other audio stimulus that commands attention and obedience of the target object. A user can tell a target object to stop, sit, or come through a live stream or a recording.

The user interface can further comprise a screen such that the alert can be provided to the target object visually. The alert can be both audio and visual or only one of the two. The visual alert can be a video recording or a live video of the user.

In another example, the deterrent mechanism can be an electric shock. The electric shock can be provided by an electric shock collar worn by the target object. The UAV can be in communication with the electric shock collar through a wired or wireless connection. In the case of a wired connection, the wired connection can be imbedded in the physical attachment mechanism between the UAV and the target object. The UAV can instruct the electric shock collar to provide an electric shock to the target object when the target object approaches a boundary or a threshold of a boundary such that the target object is exiting a permissible area or entering an impermissible area. The electric shock can be a first response to the target object approaching a boundary or a threshold of a boundary such that the target object is exiting a permissible area or entering an impermissible area. Alternatively the electric shock can be a secondary response after playing a real time or recorded voice of the user. An electric shock can be provided to the target object if the target object does not respond to the user's voice within a predetermined period of time. The predetermined period of time can be a fixed value, for example the predetermined period of time can be at least 1 second (sec), 5 sec, 10 sec, 15 sec, 20 sec, 25 sec, 30 sec, 35 sec, 40 sec, 45 sec, 50 sec, 55 sec, or 1 minute. In some cases the period of time can be a function of the speed of the target object such that the time between a user's voice and the electric shock is inversely proportional to the speed at which the target object is traveling. An additional deterrent mechanism that can be used alone or in combination with the user's voice and/or the electric shock can include emitting a noise (e.g. beep, buzz, or siren) that the target object recognizes or has been conditioned to recognize as a signal to stop moving in a direction. Another deterrent mechanism that can be used alone or in combination with the user's voice and/or the electric shock can be a spray of a liquid that has a smell that deters the target object, for example the liquid may be citronella.

In addition to or instead of defining boundaries that generate areas that are permissible and/or impermissible for the target object to travel, a user can also define a specific route along which the UAV can lead or guide a target object.

Figure 5:
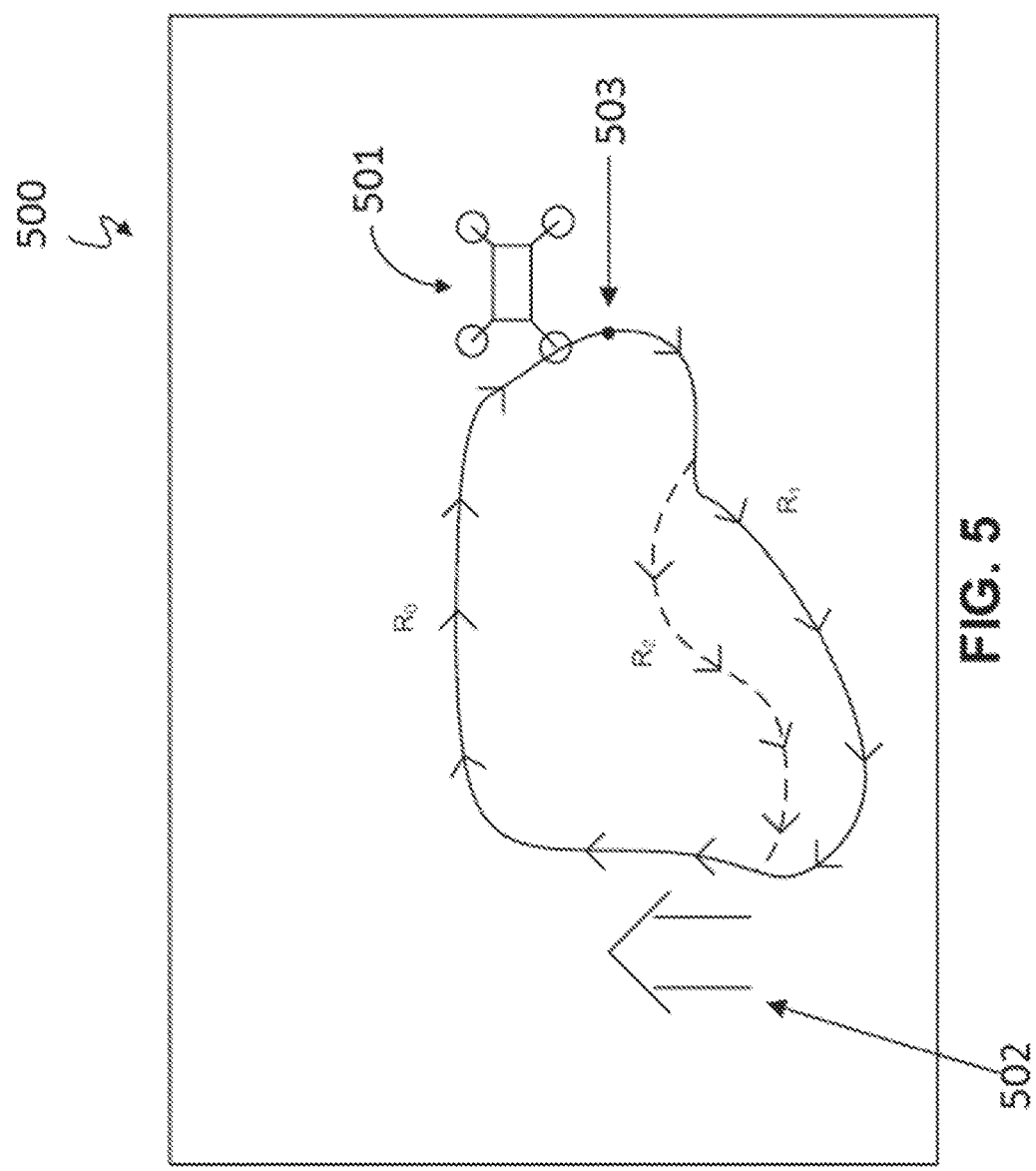

A user can define a unique route or a user can pick from a plurality of routes that can be stored on a storage memory device on or off-board the UAV. The stored routes can originate from previous routes that a user has used. In some cases the stored routes can come from other users in the area that also use a UAV to guide their target object through a route sharing network. FIG. 5 shows a map 500 with possible routes that a UAV 501 can travel to guide a target object. A UAV can start a route with a target object at a home 502. The UAV can lead the target object along route $R_0$. When the UAV reaches the midpoint 503 of the route the UAV can return to the home 502 along route $R_1$ or route $R_2$. A user can specify which route, $R_1$ or route $R_2$, should be taken by the UAV to return home 502. In some cases the user can specify the choice of $R_1$ or route $R_2$ in real time while the UAV is guiding the target object.

Additionally, a route can be changed in real time. For example, a UAV can begin guiding a target object along a route $R_0$ with the initial plan of following from $R_0$ to $R_1$. A user can, in real time, update the route such that the UAV guides the target object from $R_0$ to $R_2$ instead of from $R_0$ to $R_1$. Thus, a user may provide an input that alters a route from a pre-defined route while the UAV is in flight and traveling along the route. This may provide flexibility if an event comes up while the UAV is away. For example, if a user becomes aware of an event that requires the target object to be brought home quickly, the user may change the route while the target object is out with the UAV to bring the target object home more directly or quickly. Similarly, if the user becomes aware of construction or another event along an originally predefined route and wishes for the target object to avoid that region, the user may advantageously alter the route while the UAV is out with the target object.

The UAV can guide the target object along a travel route. The UAV can be in flight while guiding the target object. The UAV can achieve flight with one or more propulsion units, for example a propulsion unit can comprise one or more rotors. The target object can be in locomotion while the UAV is guiding the target object. A UAV can receive a travel route that describes an area or path along which the target object should be guided. The travel route can be a user input to a user device that is in communication with the UAV. The user device can be a computer, tablet, smart phone, smart watch, or smart glasses. The UAV can guide the target object along the route by flying along the travel route while the target object is in motion. The target object can be in motion close to the location of the UAV. For example, the UAV can be suspended in flight and the target object can be on the ground directly below the UAV. In some cases, the target object can be on the ground below the UAV and off set to the right, left, back or front of the UAV. The target object can be physically attached to the UAV through a physical attachment mechanism, for example, a leash. The leash can be attached on one end to the UAV and on the other end to the target object. The end of the leash attached to the target object can be attached to a collar or harness worn by the target object.

The travel route can be updated in real time. A UAV can begin guiding a target object from a starting location. The UAV can guide the target object along a first travel route. While the UAV is guiding the target object along the first travel route the UAV can receive a route update from a user device that is in communication with the UAV. The route update can provide a change from a first travel route to a second travel route. The change can be provided to make the travel route longer, shorter, to avoid a location, or to include a location that was not part of the first travel route. Once the UAV receives the updated route the UAV can continue guiding the target object along the updated route. The route can be updated at least once while the UAV is guiding the target object. In some cases the route can be updated at least once, twice, three times, four times, five times, six times, seven times, eight times, nine times, or ten times.

A user can update the travel route with a user device that is in communication with the UAV. The user device can be in communication with the UAV through a wired or wireless connection. The user can define the first travel route using a global location identifier, for example global coordinates. In some cases, the user can define the first travel route using an image or a line on a map. The map can be provided on a user interface on the user device. The image or line can be interpreted by a processor to define a travel route in global or local coordinates. A user can provide an updated route using coordinates, a map image, or a line on a map. The location of the UAV can be determined by one or more locating sensors on-board the UAV. In an example, a locating sensor can be a GPS sensor. The location of the UAV determined by the one or more locating sensors can be transmitted to a user device and/or a processor off-board the UAV. The location of the UAV can roughly define the location of the target object being guided by the UAV.

The UAV can comprise one or more vision sensors configured to capture an image of the target object. The location of the target object can be determined by one or more processors from the location of the UAV determined by the one or more locating sensors on-board the UAV and the image of the target object. The one or more processors can determine when the target object is deviating from the travel route. The travel route can be a first travel route or an updated travel route. When the processor detects that the target object has deviated from the travel route an attractor or instruction can be provided to prevent the target object from continuing to divert from the travel route and/or to force or entice the target object to return to the travel route. In an example, when the target object is deviating the travel route the UAV can play a live stream or a recording of the user's voice to the target object. The live stream or recording can be an instruction from the user for the target object to come closer to the UAV or to stop traveling in a direction away from the travel route. In some cases a user can be the target object's owner. In another case, the user can be an individual designated by the target object's owner to monitor the target object. The user's voice can be transmitted through a user device to the UAV in real time. Alternatively, the user's voice can be pre-recorded and stored on a memory storage device on or off-board the UAV. In some cases, another stimulus can be provided to the target object when the target object deviates from the travel route. The stimulus can be provided in addition to or instead of the user's voice. In some cases the stimulus can be an attractor, for example an edible treat or an emission of a smell that is of interest to a target object. The attractor can be provided to guide the target object back to the travel route. In another example, the stimulus can be an electric shock. The electric shock can signal to the target object that the target object should stop moving. The electric shock can be provided when the target object deviates from the travel route a predetermined distance.

A UAV can be configured to recognize a target object. A UAV can recognize the target object using an image recognition algorithm that can detect defining features of the target object. For example, the UAV may be able to discern target object size, gait, coloration/patterns, or proportions (e.g., limbs, torso, face).

In some cases, the UAV can detect a collar worn by the target object using a vision sensor on-board the UAV. A collar worn by a target object can have unique identifiers such that the UAV can distinguish the collar worn by the target object from another collar worn by an alternative target object. The distinguishing features can be patterns, symbols, or a unique combination of numbers and letters.

Figure 6:
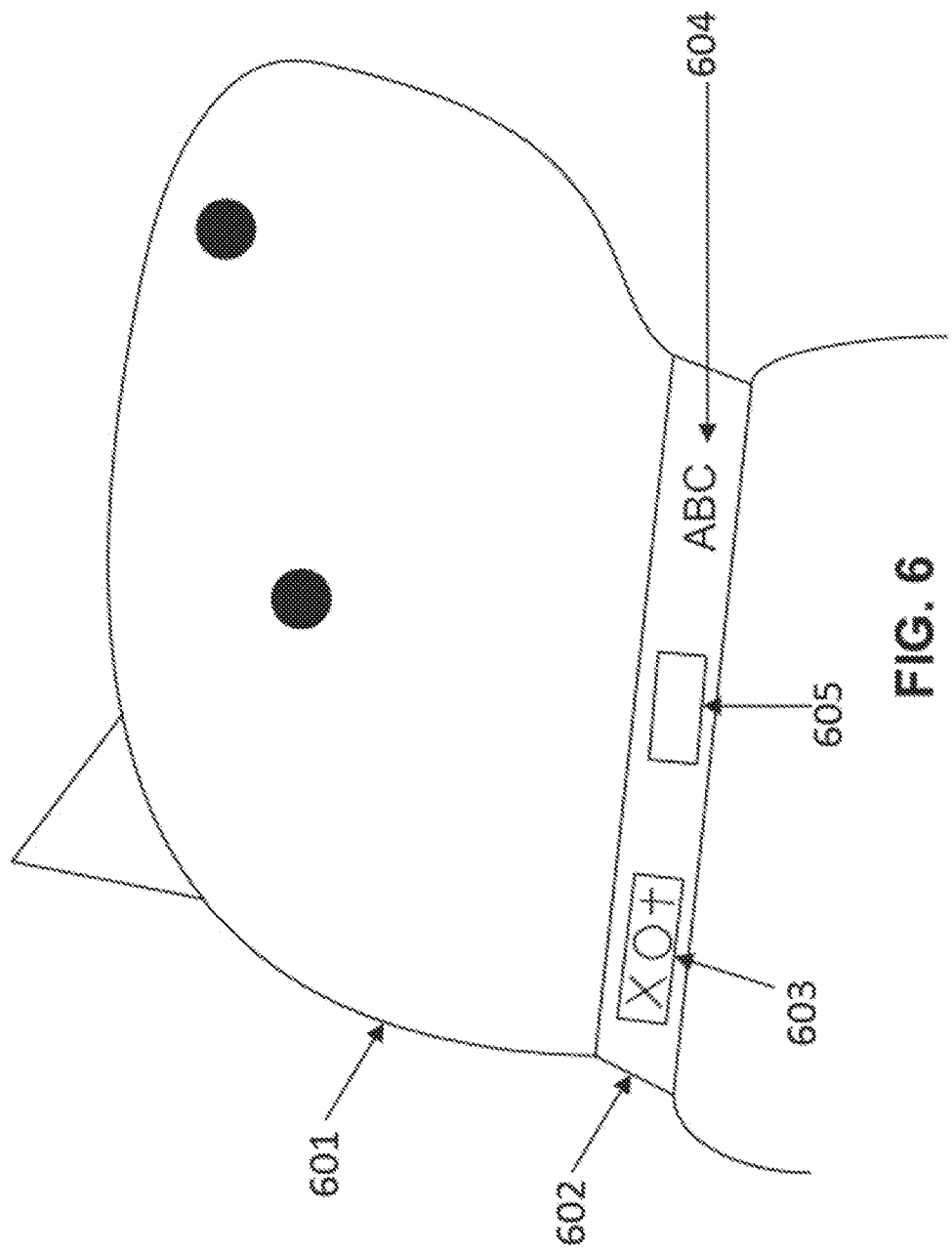
FIG. 6 shows a target object wearing a collar that can be recognized by a UAV.

FIG. 6 shows an example of a target object 601 wearing a collar 602 that can be recognized by a UAV. Description of the collar can apply to any object that is wearable by the target object, for example, a harness, sweater, ankle band, hat, or paw bootie. The UAV can recognize target object wearing the collar using one or more vision sensors on-board the UAV. The collar 602 can comprise at least one of a pattern of symbols 603, letters 604, or numbers. The pattern of symbols 603, letters 604, or numbers can be provided on a display screen on the collar. The pattern of symbols 603, letters 604, or numbers can be a constant display or the display can change. In some cases a pattern displayed on the collar can communicate information to the UAV. The collar can emit a signal that can be detected by the UAV for example an IR signal. The collar can further comprise at least one component 605 configured to permit connection to a physical connection mechanism between a UAV and the collar. The component 605 configured to permit connection to a physical connection mechanism between a UAV and the collar can be a magnet, hook, hole, rivet, snap, or other connection hardware.

A UAV can be configured to attach to the collar of the target object using a physical connection mechanism (e.g. leash) automatically without human intervention. In some cases, the UAV may require human intervention to attach to the collar of the target object. The UAV can attach to the collar of the target object after confirming recognition of the target object using one or more vision sensors to detect the target object. The leash can attach to the collar using a magnetic mechanism such that a magnet on the collar is attracted to a magnet on an end of the leash. In some cases only one of either the leash end or the collar can comprise a magnet and the other component (e.g. leash end or collar) can comprise a metal that is attracted to the magnet. The leash can be made from a flexible and/or bendable material, for example plastic, rubber, elastic, or another flexible material.

The UAV can attach a leash to the target object automatically without human aid or intervention. The UAV can attach a least to the target object using a mechanical mechanism. Mechanical mechanism can be a hook, clamp, or robotic arm. In cases in which the mechanical mechanism is a robotic arm the robotic arm can be on-board the UAV. The robotic arm can extend and retract to guide a leash to a collar on a target object. In some cases, the robotic arm can extend and retract using a telescoping mechanism. The UAV can hover directly above or to a side of the target object while the UAV is attaching a leash to the target object. One or more vision sensors can detect the location of the target object while the UAV is attaching the leash to the target object. When the vision sensors detect movement of the target object, the UAV may move to stay in a location directly above or to the side of the target object. The robotic arm can have a feature at its terminal end configured to attach the leash to a collar on the target object. The leash can attach to the collar using any mechanical or electrical connection mechanism for example, a hook and loop, snap, magnetic, Velcro, or any other mechanical coupling mechanism. The coupling mechanism between the leash and the collar on a target object can be generic or the coupling mechanism can have a size or shape that is unique to a specific leash and collar connection. The unique coupling mechanism can prevent a UAV from accidentally connecting to a wrong target object. Alternatively, one or more vision sensors on-board the UAV can detect the target object while the UAV is attaching the leash to the target object to verify that the UAV is attaching the leash to the correct target object. Other sensors may be used to verify that the leash is attached to the correct target object. For instance, a collar or other wearable connection of the target object may interact with the leash to confirm the correct identity. For instance, a signal may pass between the collar and leash upon contact or wirelessly. The signal may include an identifier of the collar which may be verified by the leash, UAV or any processors anywhere in the system.

The physical connection mechanism between the UAV and the target object can have a fixed or adjustable length. The length of the physical connection mechanism can determine a permitted distance between a UAV and a target object. In cases where the length of the physical connection mechanism is adjustable the physical connection mechanism can be retractable. The maximum extension of the physical connection can be fixed or the maximum extension of the physical connection can be determined by a location or a distance from a defined boundary. For example, when a UAV attached to a target object with a physical connection mechanism is a relatively far from a defined boundary the physical connection mechanism can be extended to a relatively long length. In comparison, when the UAV attached to a target object with a physical connection mechanism is a relatively close to a defined boundary the physical connection mechanism can be extended to a relatively short length. The physical connection mechanism can be extended and retracted while the UAV is in flight.

Figure 7:
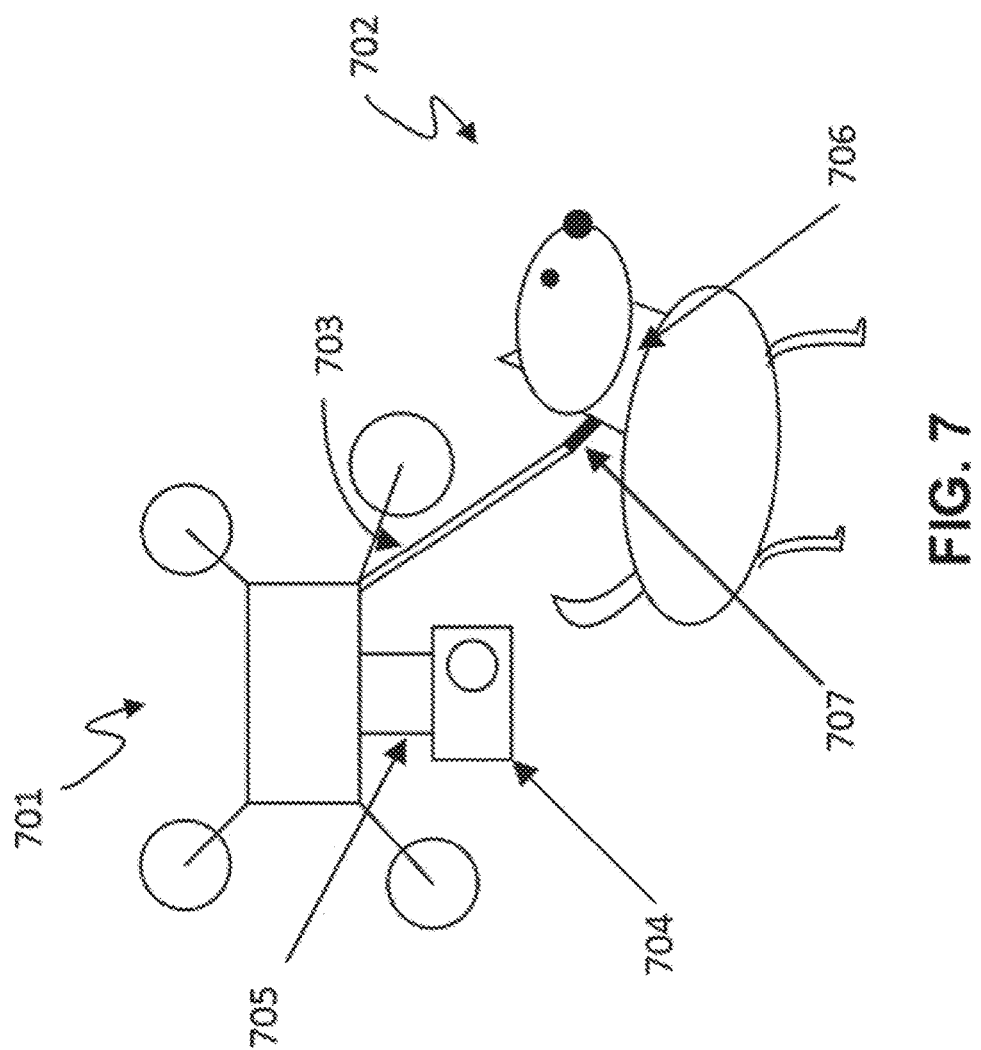
FIG. 7 shows a UAV guiding a target object while physically connected to the target object.

FIG. 7 shows an example of a UAV 701 and a target object 702. The UAV 701 is connected to the target object 702 through a physical mechanism 703, for example a leash. The UAV 701 can have at least one on-board vision sensor 704, for example a camera. The vision sensor 704 can be on the body of the UAV or the vision sensor 704 can be extended from a surface of the UAV, for example the bottom surface, by a support structure 705. The vision sensor 704 can be movable relative to the UAV. The vision sensor 704 can be configured to rotate and/or translate independent of the position of the UAV. The vision sensor can capture at least one image of a target object. The vision sensor can be moved to track the movement of the target object. The image can be stored on a memory storage device on or off-board the UAV. The image can be analyzed to identify a target object. The image may be of the target object or a collar 706 worn by the target object. The UAV can be in communication with one or more processors on or off-board the UAV. The processors can be configured to analyze an image from a vision sensor and recognize the target object from an image of the target object or an image of the collar 706. When a target object 702 is positively identified by the one or more processors the UAV 701 can approach the target object 702 and attach the physical mechanism 703 to the collar 706 worn by the target object. The UAV can automatically attach the physical mechanism to the collar 706 worn by the target object 702 by joining a mating or coupling connection on a terminal end of the physical mechanism to a corresponding connection 707 on the collar.

Once a target object has been positively identified and connected to a physical mechanism (e.g. leash) attached to a UAV, the UAV can fly while the target object is in locomotion. The UAV can guide a target object by pulling on the leash. The pulling force with which the UAV pulls on the least can be calculated from the motion of the target object and the motion of the UAV. The motion of the target object and the motion of the UAV can be compared to determine one or more parameters with which the UAV pulls on the leash. In an example, parameters that can be determined may be the magnitude and/or the direction of the pulling force. The magnitude of the pulling force can fall within a predefined range. The predefined range of pulling forces can be determined by a user or calculated from a user input. A user input can be the weight of the target object. The UAV can be configured to provide sufficient force to control a target object having a weight of at least 1 kilogram (kg), 2 kg, 3 kg, 4 kg, 5 kg, 10 kg, 15 kg, 20 kg, 25 kg, 30 kg, 35 kg, 40 kg, 50 kg, 55 kg, 60 kg, 65 kg, 70 kg, 75 kg, 80 kg, 85 kg, 90 kg, 95 kg, 100 kg, 105 kg, 110 kg, 115 kg, 120 kg, 125 kg, 130 kg, 135 kg, 140 kg, 145 kg, or 150 kg.

The UAV can continuously collect images of the target object while the UAV is in flight and the target object is in locomotion or while the target object is stationary. The target object can be attached or tethered to the UAV with via a leash while the UAV is collecting images of the target object. The images of the target object can be saved on a memory storage device that can be on-board or off-board the UAV. The UAV can collect images of the target object with a vision sensor. The vision sensor can collect still images or video images of the target object. The UAV can comprise at least one additional vision sensor configured to collect images of the environment. In some cases, the at least one additional vision sensor can track other objects in the environment. In some cases, the images can be displayed to a user through a user interface that is in communication with a processor on or off-board the UAV. The user interface can also display the location of the UAV while it is attached to the target object. The location may be shown on a map in the user interface.

A UAV can play the user's voice to the target object while the target object is attached to the UAV by a leash or other physical attachment mechanism. The UAV can play the user's voice to the target object while the target object is in locomotion and/or while the UAV is flying. The user's voice can be provided by the UAV through an audio or visual display on-board the UAV. The target object may be familiar and therefore more responsive to the user's voice as compared to a voice from a human that is not the user. In some cases the user's voice can be provided to the target object in real time. The user's voice can be transmitted from the user device to the UAV in real time. The user's voice can say a command to the target object. In an example, a user can receive an image of a target object and/or a location of a UAV attached to a target object through a user interface on a user device. The user may wish to speak to the target object in response to the image or location of the target object. For example, the user can speak to the target object to provide positive or negative feedback in response to the image or location of the target object. The user can speak to the target object in real time by transmitting their voice through the user device to the UAV. In some cases, the user's voice can be a pre-recording. The pre-recording can be an audio or video recording of the user. A processor on or off-board the UAV can be configured to recognize a behavior or action committed by the target object from an image of the target object or a location of a UAV attached to a target object. The processor can instruct the UAV to provide a pre-recording of a user's voice to provide a command or negative or positive feedback to a target object in response to a detected behavior or action committed by the target object. In some cases, a user can recognize a behavior or action committed by the target object from an image of the target object or a location of a UAV attached to a target object provided on a user device's user interface. The user can transmit an instruction the UAV to provide a pre-recording of a user's voice to provide a command or negative or positive feedback to a target object in response to a detected behavior or action committed by the target object.

Figure 8:
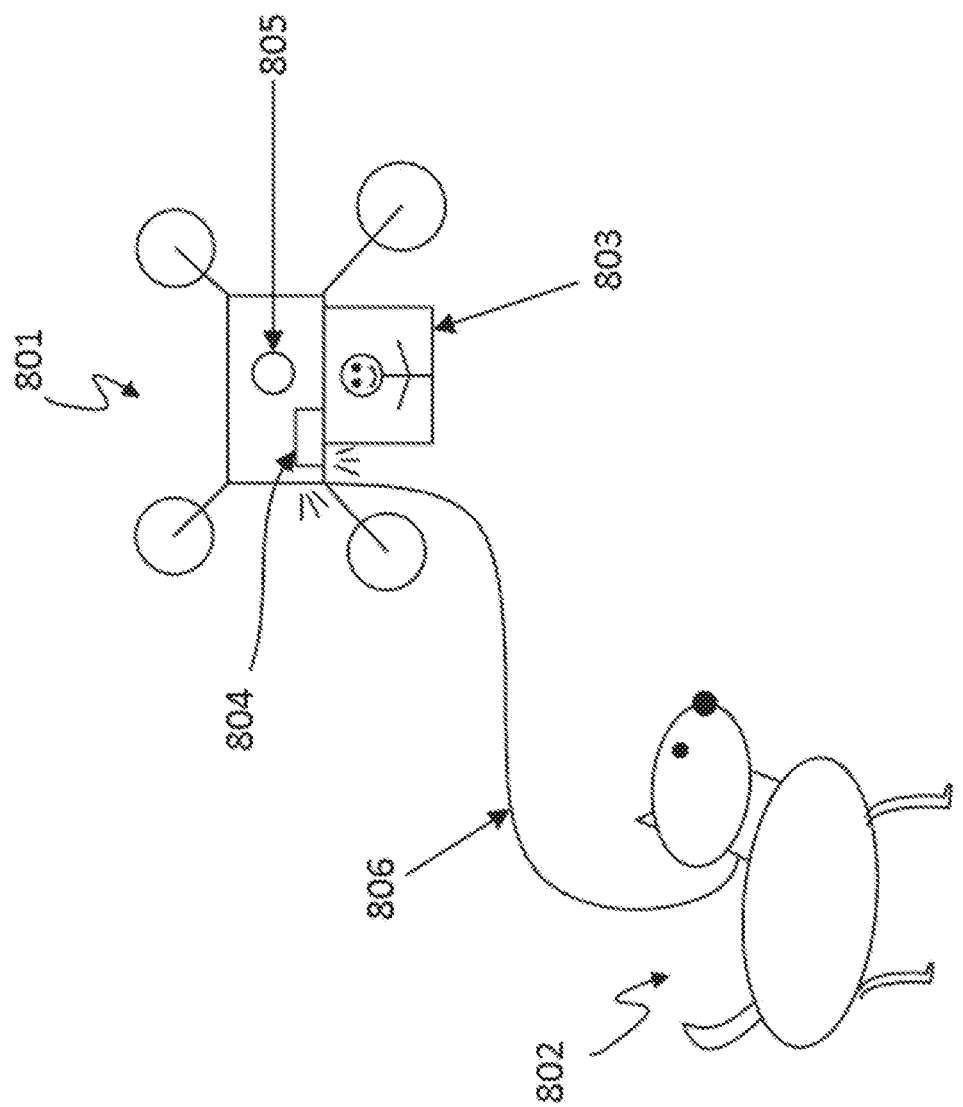
FIG. 8 shows a UAV displaying audio and/or visual stimuli from a user to a target object.

FIG. 8 shows an example of a UAV 801 and a target object 802 where the UAV is providing an audio and visual stimulus to the target object. The visual stimulus can be provided to the target object through a screen 803 on-board, carried by, or attached to the UAV 801. The screen can be permanently exposed or the screen can be folded or retracted into the UAV when it is not in use. The audio stimulus can be provided through a microphone or speaker 804 on-board the UAV. The audio stimulus can be a recording or a live stream of a user's voice. A user can be the owner of the target object or an individual designated to monitor the target object while it is being guided by the UAV. In some cases the microphone can be bi-directional such that a user's voice can be provided to the target object and an audio response (e.g. barking, meowing, or whining) from the target object can be collected and transmitted to a user through a user device. The UAV 801 can further comprise one or more visual sensors 805. The visual sensors can collect still images and/or video images of the target object. The images can be analyzed by one or more processors on or off-board the UAV to recognize the target object. The images can be further analyzed to determine the location of the target object relative to a known location of the UAV. The UAV can be attached to the target object through a physical connection, for example, a leash 806.

In some cases the UAV may not be attached to the target object while the UAV is guiding the target object. A UAV can guide the target object by recognizing the target object and automatically, without human aid or invention, display an attractor to the target object. The UAV can fly while displaying the attractor and the target object can be in locomotion following the attractor. The attractor can be a visual, auditory, or olfactory stimulus that is configured to attract the attention of the target object. In some cases the attractor can be an edible treat, for example, a dog treat, bacon, peanut butter, or another edible product that is desirable to a target object. In some cases, the attractor can emit a scent. The scent can be associated with an entity that is of interest to a target object, for example, a food item or another target object. The attractor can emit the scent from the entity itself or from a chemical configured to have a scent typically associated with the entity. For example a strip of bacon can be stored on-board the UAV and the scent of the bacon can be wafted towards the target object. Alternatively, the UAV can have a chemical configured to smell like bacon stored on-board the UAV. The UAV can emit a spray or mist of the chemical to attract the target object.

In some cases, the attractor can be an image that is displayed on a screen carried by the UAV. The image can be a static image or a video. The image can depict an owner of the target object. The image of the owner can be a static image or a video. The image may be accompanied by an audio recording or a live audio stream of the owner. The UAV can comprise an audio player (e.g. speaker or microphone) that can play the user's voice to the target object while the target object is in locomotion and is attached to the UAV via a leash or while the target object is being guided by the UAV without a leash. The user's voice can be transmitted from a user device to the UAV in real time. A user can be the owner of the target object. In some cases the user's voice can be prerecorded. A combination of edible treats and images can be used in combination or consecutively to attract the target object.

Figure 9:
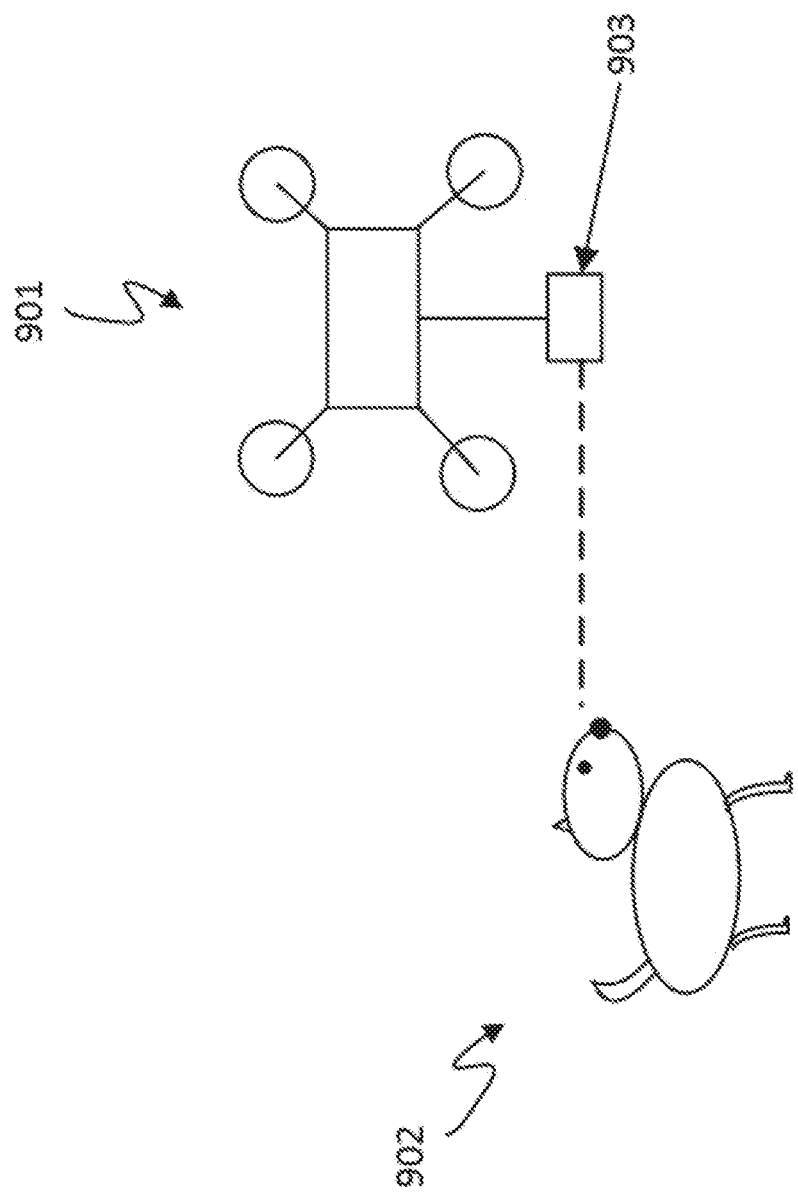
FIG. 9 shows a UAV guiding a target object without a physical connection to the target object.

The UAV can carry the attractor outside of the body of the UAV. The attractor can be connected to the UAV by a support structure. The attractor can be moved vertically and/or horizontally relative to the UAV. In some cases, the attractor can rotate relative to the UAV. The UAV can display the attractor by dangling the attractor at or near a head level of the target object. FIG. 9 shows an example of a UAV 901 guiding a target object 902 with an attractor 903. The UAV 901 can comprise one or more on-board vision sensors. The visions sensors on-board the UAV 901 can be configured to determine, with the aid of one or more processors, the location of the target object 902 relative to the UAV 901. The UAV can be instructed by the one or more processors to adjust or maintain the flight speed of the UAV such that the UAV remains within a proximity of the target object. The proximity to the target object can be set to a distance that is sufficiently close for the target object to perceive the attractor 903. One or more vision sensors can be configured to determine the trajectory of the locomotion of the target object 902 relative to the UAV 903. The determined trajectory of the locomotion of the target object relative to the UAV can result in an instruction to the UAV to adjust or maintain the direction of the UAV flight to remain within a proximity of the target object. The proximity to the target object can be set to a distance that is sufficiently close for the target object to perceive the attractor 903. In some cases the vision sensors can determine the location or a target object and/or the trajectory of locomotion of target object and cause a movement of the attractor 903. The attractor 903 can be moved to increase or decrease interaction of the target object with the attractor. For example, if a target object is jumping upward an attractor can be raised to avoid contact with the target object. In another example, a target object can move to a side of the UAV and the attractor may rotate relative to the UAV to remain in a line of sight with the target object.

In some cases the attractor can be an edible treat. A target object can be initially attracted to an edible treat. After a period of time the target object can become frustrated or discouraged if the edible treat is not provided for consumption. UAV can be configured to periodically provide the target object with at least a fraction of an edible treat that is being used as an attractor. The fraction of the edible treat can be provided as a reward for a positive behavior or action and/or to keep the attention of the target object while the target object is being guided by the UAV. The UAV can provide the fraction of the edible treat to the target object at fixed intervals, at specified route locations, or whenever the one or more vision sensors detect that the target object appears to be losing interest in the attractor, where the attractor is an edible treat. A vision sensor can detect that a target object is losing interest in the attractor, where the attractor is an edible treat when the target object suspends locomotion or wanders away a threshold distance from the location of the UAV.

A target object can generate waste while the target object is being guided by the UAV. In some locations it may be impermissible to leave waste generated by the target object in the location where it was generated. A UAV can be configured to guide a target object and to recognize waste generated by the target object. In some cases the UAV can be configured to collect and dispose of waste generated by the target object. A UAV can recognize waste generated by a target object using a one or more vision sensors. The vision sensors may be on-board the UAV. The vision sensors can be the same vision sensors used to recognize the target object or the vision sensors can be a second set of sensors that are not used to recognize the target object. The UAV can recognize waste generated by the target object and alert a user (e.g. owner of the target object) that waste has been generated by the target object. The UAV can provide an alert to a user that includes the location of the waste generated by the target object. The vision sensors can be configured to capture an image of the target object and the waste generated by the target object. The image can be a still photograph or a video image. The UAV can comprise on or more processors that are configured to recognize the target object from the image and also recognize waste generated by the target object from the image. The one or more processors can be located on or off-board the UAV. The UAV can further comprise a communication unit configured to send a signal to a user device that alerts the user that the waste has been generated by the target object.

Figure 10:
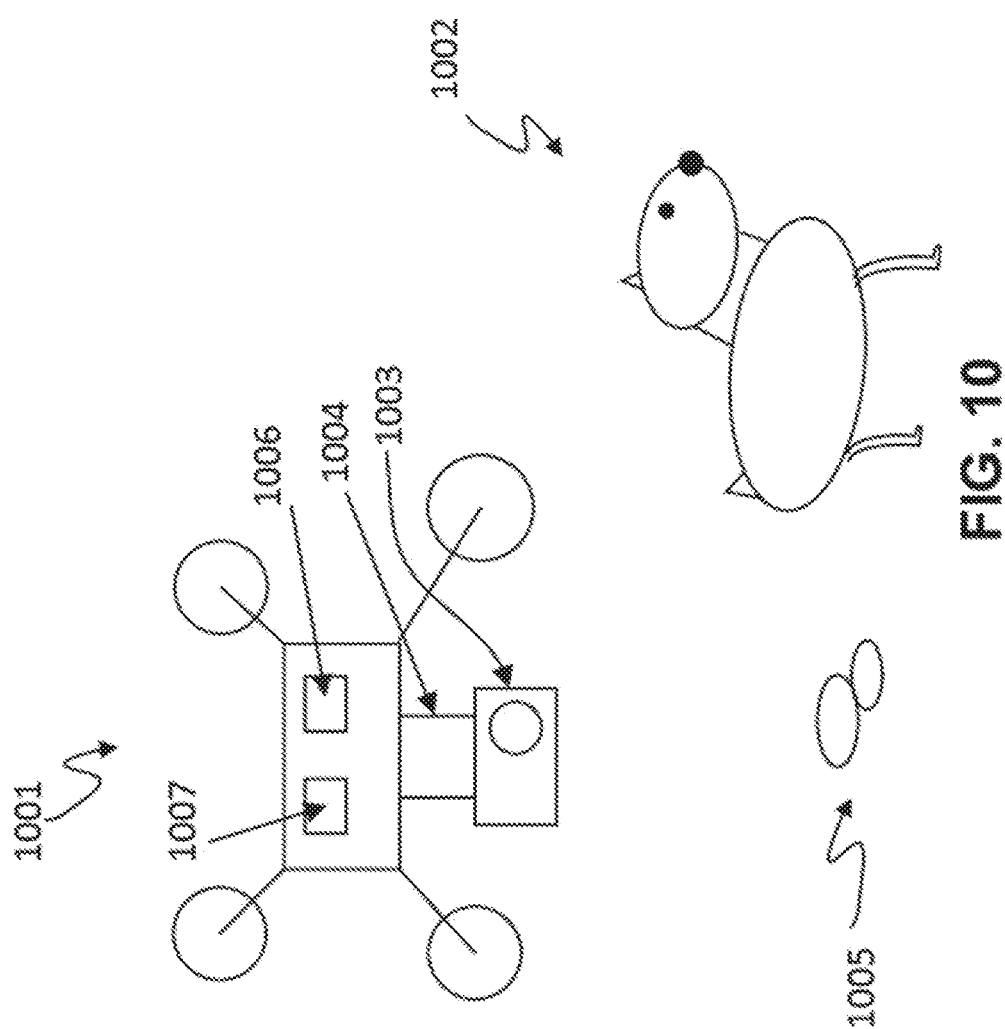
FIG. 10 shows a UAV recognizing waste generated by a target object.

FIG. 10 shows an example of a UAV 1001 that is guiding a target object 1002. The UAV can comprise one or more vision sensors 1003. The one or more vision sensors 1003 can be inside the body of the UAV 1001 or suspended from an outer surface of the UAV 1001 by a support structure 1004. In some cases the vision sensor can be configured to translate and/or rotate independently of the UAV 1001. The target object 1002 can be attached to the UAV 1001 by a physical attachment. In some cases the target object 1002 may not be attached to the UAV 1001. The vision sensor 1003 can be configured to recognize a target object 1002 and collect an image of the target object 1002. The vision sensor 1003 can be further configured to recognize waste 1005 generated by a target object with the aid of one or more processors. The one or more processors 1007 can be on-board the UAV. The vision sensors can capture and image of the waste. The images captured by the vision sensor can be stored on a memory storage device 1006. The memory storage device can be on or off-board the UAV. The one or more processors 1007 can be configured to recognize waste generated by the target object from one or more images of the waste provided by the vision sensor. The UAV can further comprise a communication unit configured to send or transmit a signal to a user device to alert the user (e.g. owner of the target object) that the target objected has generated waste.

The communication unit can send or transmit a signal or alert to a user device to alert a user that the target object has generated waste. The user device can be a smartphone, tablet, personal computer, smart watch, smart glasses, or a wireless pager. The user device can comprise a user interface. The user interface can be interactive such that a user can control the UAV through the user interface. The alert can be an audio, visual, or tactile (e.g. vibration) alert. The alert can include a location where the waste was generated. The location can be provided in global coordinates. In some cases the location can be displayed on a map provided on the user interface on the user device. The user device can also provide an image of the waste generated by the target object.

A user can receive alerts about the location of the target object, behavior of the target object, and the location of waste generated by the target object. In some cases, a user can be the owner of the target object. Alternatively a user can be a waste removal professional. A waste removal professional can be a friend of a user, an acquaintance of a user, a volunteer, or an employee hired by the user. A waste removal professional can be any human that removes waste generated by the target object. A communication unit onboard the UAV can provide alerts to a waste removal professional about the time and/or location of waste generation by the target object. A waste removal professional can be contracted by an owner of the target object to dispose of waste generated by a target object. In some cases, a waste removal professional can be a volunteer. The owner of the target object can provide an item of value (e.g. currency, credit, or commodity) in exchange for removal of the waste generated by the target object. The waste removal professional can be compensated with a flat weekly, monthly, quarterly, bi-yearly or yearly rate. In some cases the waste removal professional can be compensated per waste disposal.

Figure 11:
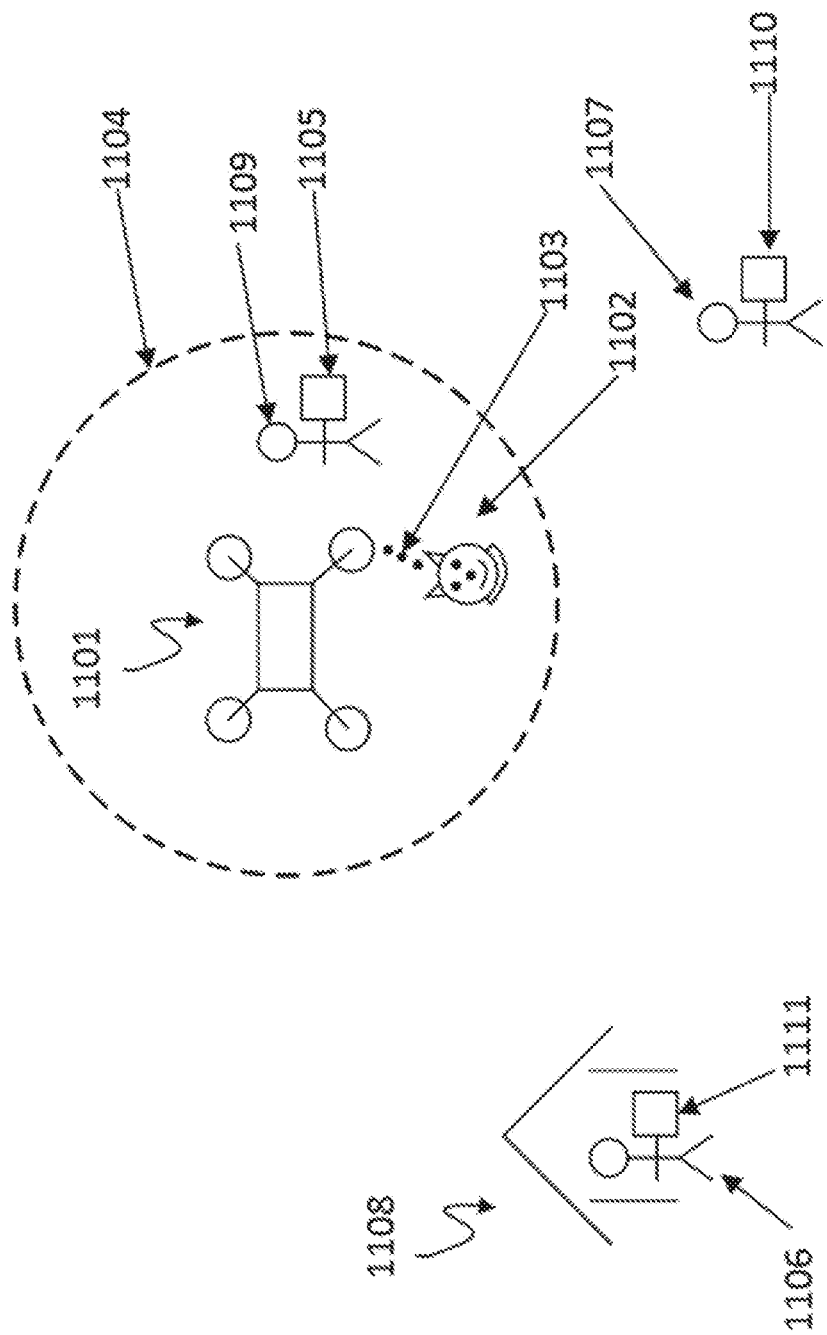
FIG. 11 shows process in which a UAV may alert a user of the occurrence and location of waste generated by a target object.

FIG. 11 shows an example of an alert from a UAV 1101 indicating that a target object 1102 has generated waste 1103. The alert can include the exact location of the waste or a general region in which the target object generated the waste. The alert can be transmitted from the UAV to a user device 1105 in communication with the UAV. The user device can be a computer, smart phone, tablet, smart watch, or smart glasses. The waste location or region of the waste location can be provided in relative or global coordinates. The alert can be provided only to waste removal professionals within a specified radius of the waste generation location 1104. A waste removal professional 1107 outside of the region 1104 may not receive an alert on their electronic device 1110. In some cases, the location can be provided on a map displayed on a user interface on a user device 1105. The alert can be provided to either or both of an owner 1106 of a target object and a waste removal professional 1109 within a specified radius of the waste generation location 1104. The owner of the target object or the waste removal professional can be set as a default to receive an alert to collect and/or dispose of the waste. In some cases the owner of the target object can be the default to collect and/or dispose of the waste, the owner can choose to divert the alert to a waste removal professional using their electronic device 1111. The owner may choose to divert the alert to a waste removal professional when they do not want or are not able to leave their home 1108, office, store, school, or other location to collect and/or dispose of the waste. In some cases the owner of the target object can control the alerts such that a waste removal professional is the default receiver of a waste alert during specified hours. For example, an owner can be the default recipient during morning and evening hours and a waste removal professional can be the default recipient during the middle of the day. The recipient that receives the alert (e.g. the owner or the waste removal professional) can travel to the location or the region in which the waste is generated and remove, collect, or dispose of the waste.

The UAV can be configured to recognize and remove waste generated by the target object. The UAV can capture one or more images of the target object and waste generated by the target object. One or more processors on or off-board the UAV can be configured to recognize the target object from the one or more images of the target object and to recognize waste generated by the target object from the one or more images of the waste generated by the target object. The UAV can comprise one or more waste removal units. The waste removal units can be configured to remove waste in response to recognition of the waste generated by the target object. The waste removal unit can include a mechanism configured to extend from the UAV to remove the waste, for example a mechanical arm. The mechanism configured to extend from the UAV to remove the waste can be an extendible structure with a scoop, shovel, or disposable container (e.g. plastic bag) at a terminal end configured to collect, remove, and/or dispose of waste generated by the target object. The UAV can be configured to collect waste generated by the target object and store the waste until it can be disposed of in a disposal container (e.g. trashcan, landfill, dumpster, or compost collector). The UAV can comprise one or more vision sensors that can capture images of the environment in the vicinity of the UAV. The images of the environment can be analyzed by one or more processors on-board or off-board the UAV that can be configured to recognize a disposal container. In response to locating the disposal container the UAV can dispose of the waste in the disposal container. If the disposal container is located outside of a permissible area of travel for the target object or inside of an impermissible area for travel of the target object the UAV can continue to store the waste until a disposal container inside of a permissible area or outside of an impermissible area is located.

The systems, devices, and methods described herein can be applied to a wide variety of movable objects. As previously mentioned, any description herein of a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant on-board the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
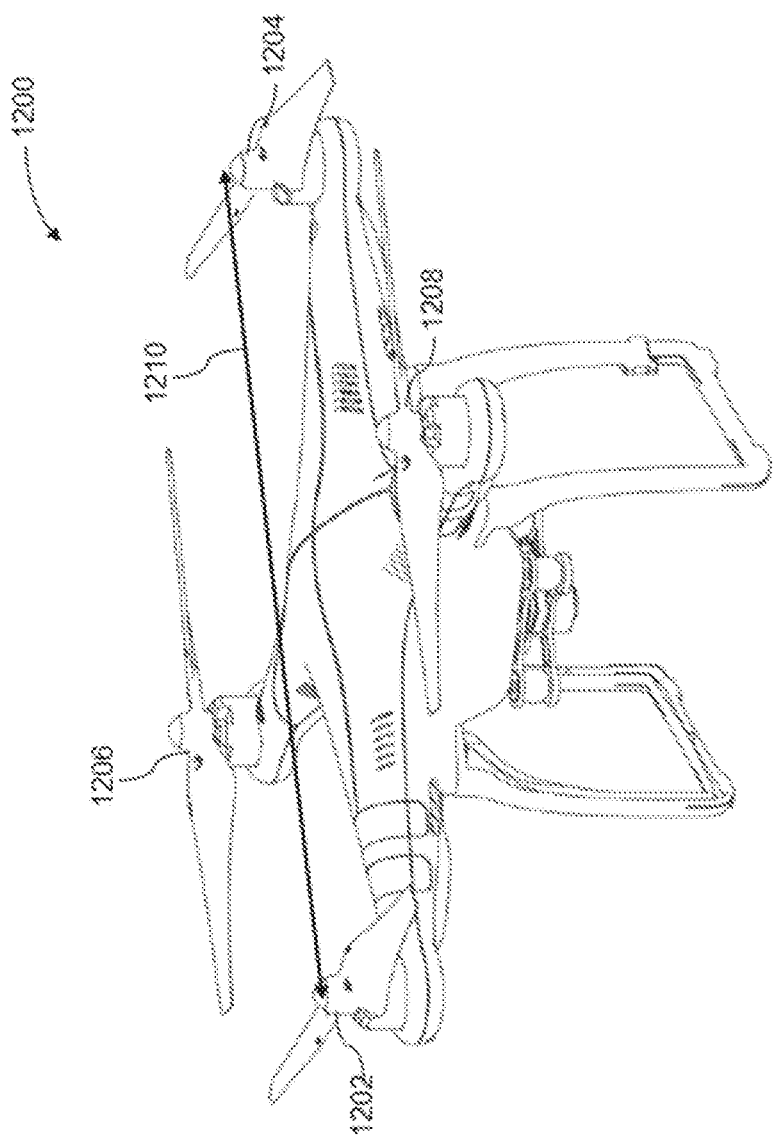
FIG. 12 illustrates an unmanned aerial vehicle, in accordance with an embodiment of the invention.

FIG. 12 illustrates an unmanned aerial vehicle (UAV) 1200, in accordance with embodiments of the present invention. The UAV may be an example of a movable object as described herein. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1210 can be less than or equal to 2 m, or less than equal to 5 m. In some embodiments, the length 1210 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 13:
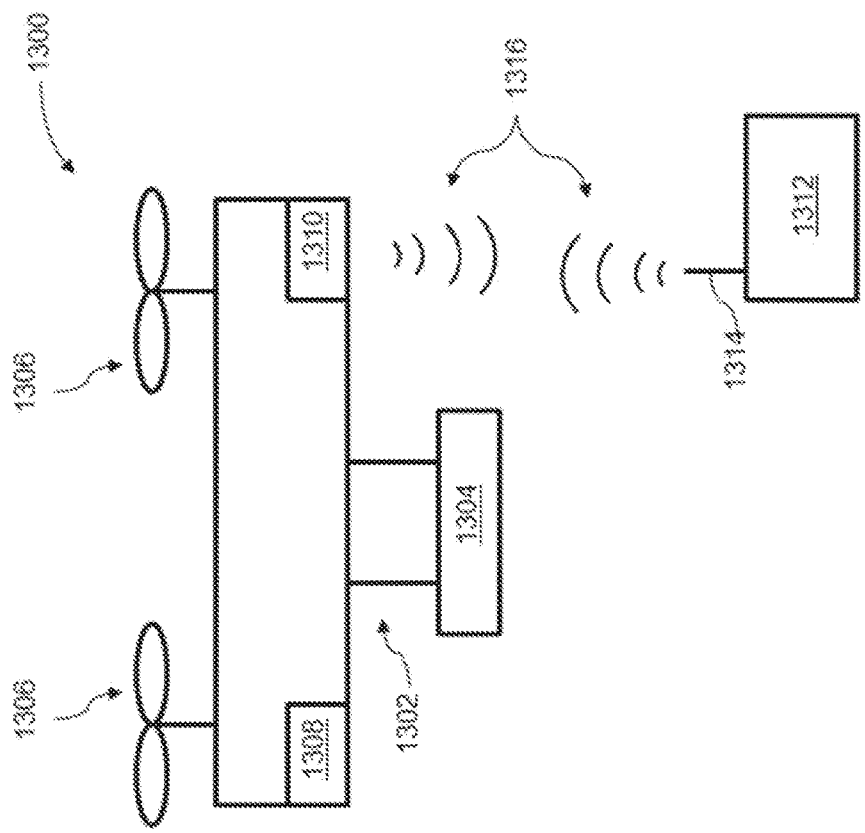
FIG. 13 illustrates a movable object including a carrier and a payload, in accordance with an embodiment of the invention.

FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms.

Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication.

The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

FIG. 14 is a schematic illustration by way of block diagram of a system 1400 for controlling a movable object, in accordance with embodiments. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 1408 configured to control a state of the movable object. For example, the control module 1408 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) configured to guide a target, said UAV comprising:
   one or more vision sensors configured to capture an image of the target wearing an object;
   one or more processors configured to, individually or collectively, recognize the target from the image of the target wearing the object;
   an attachment mechanism configured to automatically attach, without human aid, to the object of the target when the target is recognized; and
   one or more propulsion units configured to permit flight of the UAV while the target is attached to the UAV via the attachment mechanism.

2. The UAV of claim 1, wherein the target is an animal.

3. The UAV of claim 1, wherein the UAV is flying while guiding the target in motion.

4. The UAV of claim 1, wherein the attachment mechanism is extendible or retractable while the UAV is in flight.

5. The UAV of claim 1, wherein the attachment mechanism is configured to attach to the object of the target using one or more magnetic connection.

6. The UAV of claim 1, wherein the attachment mechanism is configured to attach to the object of the target with aid of a robotic arm.

7. The UAV of claim 6, wherein the robotic arm comprises one or more extension that guides the attachment mechanism to the object.

8. The UAV of claim 1, wherein the one or more processors are configured to recognize the target from the image of the object and/or the image of the target.

9. The UAV of claim 1, wherein the one or more processors are configured to, subsequent to recognizing the target, generate a signal to effect flight of the UAV to a closer proximity of the target in order to get into position to automatically attach the UAV to the object of the target.

10. The UAV of claim 1, wherein the UAV guides the target by displaying an attractor to the target.

11. The UAV of claim 1, wherein the UAV is configured to guide the target by pulling on the attachment mechanism.

12. The UAV of claim 11, wherein the one or more processors are configured to compare a calculation of the target motion and the UAV motion to determine one or more parameter with which the UAV pulls on the attachment mechanism.

13. The UAV of claim 1, wherein the one or more vision sensors are configured to collect an image of the target while the target is in motion and is attached to the UAV via the attachment mechanism.

14. The UAV of claim 1, further comprising one or more speakers configured to play a voice to the target while the target is in motion and is attached to the UAV via the attachment mechanism.

15. The UAV of claim 14, wherein the voice is transmitted from the user device to the UAV in real-time.

16. The UAV of claim 14, wherein the voice is a pre-recording.

17. A UAV configured to guide a target, said UAV comprising:
   one or more vision sensors configured to capture an image of the target and waste generated by the target;
   one or more processors configured to, individually or collectively, (1) recognize the target from the image of the target, and (2) recognize the waste generated by the target from the image of the waste generated by the target; and
   one or more propulsion units configured to permit flight of the UAV while guiding the target object.

18. The UAV of claim 17, further comprising a communication unit configured to send a signal to a user that alerts the user that the waste has been generated by the target.

19. The UAV of claim 17, wherein the UAV is configured to provide information to the user about a location where the waste was generated.

20. The UAV of claim 17, wherein the UAV guides the target by being physically attached to the target.

21. The UAV of claim 17, wherein the one or more vision sensors are further configured to capture images of a disposal container for disposing the waste.

22. The UAV of claim 17, wherein one or more processors are further configured to recognize the disposal container.

23. The UAV of claim 17, further comprising one or more waste removal units configured to remove the waste in response to the recognition of the waste.

24. The UAV of claim 23, wherein the one or more waste removal units include an extendible structure with a scoop, shovel, or disposable container.

25. The UAV of claim 23, wherein the one or more waste removal units include a mechanical arm that extends from the UAV to remove the waste.

26. A method of guiding a target object using an unmanned aerial vehicle (UAV), said method comprising:
   recognizing the target wearing an object, with aid of one or more vision sensors on board the UAV;
   automatically attaching, without human aid, the UAV to the object of the target using an attachment mechanism when the target is recognized; and
   flying the UAV while the target is attached to the UAV via the attachment mechanism.

27. The method of claim 26, further comprising:
   comparing a calculation of the target motion and the UAV motion; and
   determining one or more parameters with which the UAV pulls on the attachment mechanism based on the comparison.

28. The method of claim 26, further comprising collecting one or more images of the target while the target is in motion and is attached to the UAV via the leash.

29. A method of removing waste of a target object, said method comprising:
   recognizing the waste generated by the target, with aid of the one or more vision sensors on board a UAV; and
   removing the recognized waste using a mechanical arm that extends from the UAV.

30. The method of claim 29, wherein recognizing the waste and/or removing the recognized waste are performed while the target is in motion.

* * * * *